US012005381B2

(12) United States Patent
Zhou et al.

(10) Patent No.: US 12,005,381 B2
(45) Date of Patent: Jun. 11, 2024

(54) HEAT INTEGRATED PROCESS AND SYSTEM FOR ETHANOL PRODUCTION USING VAPOR RECOMPRESSION

(71) Applicant: WHITEFOX TECHNOLOGIES LIMITED, London (GB)

(72) Inventors: Jin Ming Zhou, Calgary (CA); Thiago Righi, Calgary (CA); Chenxu Shi, Calgary (CA); Stephan Blum, Calgary (CA); Virginia Andrade, Calgary (CA)

(73) Assignee: WHITEFOX TECHNOLOGIES LIMITED, London (GB)

( * ) Notice: Subject to any disclaimer, the term of this patent is extended or adjusted under 35 U.S.C. 154(b) by 0 days.

(21) Appl. No.: 17/967,144

(22) Filed: Oct. 17, 2022

(65) Prior Publication Data

US 2023/0123549 A1    Apr. 20, 2023

Related U.S. Application Data

(60) Provisional application No. 63/338,725, filed on May 5, 2022, provisional application No. 63/256,116, filed on Oct. 15, 2021.

(51) Int. Cl.
*B01D 3/00* (2006.01)
*B01D 3/14* (2006.01)
*C12H 6/02* (2019.01)

(52) U.S. Cl.
CPC ............ *B01D 3/148* (2013.01); *B01D 3/001* (2013.01); *B01D 3/007* (2013.01); *B01D 3/146* (2013.01); *C12H 6/02* (2019.02); *B01D 2257/80* (2013.01)

(58) Field of Classification Search
CPC ... B01D 3/001–005; B01D 3/007; C12H 6/02
See application file for complete search history.

(56) References Cited

U.S. PATENT DOCUMENTS

| 4,217,178 A | 8/1980 | Katzen et al. |
| 4,306,942 A | 12/1981 | Brush |
| 4,326,036 A | 4/1982 | Hayes |
| 4,340,446 A | 7/1982 | Crawford |
| 4,405,409 A | 9/1983 | Tusel et al. |
| 4,407,662 A | 10/1983 | Ginder |

(Continued)

FOREIGN PATENT DOCUMENTS

| CA | 3076506 | 3/2019 |
| JP | 2016047530 | 4/2016 |
| WO | 2016088134 | 6/2016 |

OTHER PUBLICATIONS

Roy, Christian; "Vaperma Siftek Membrane for Ethanol Refining: A General Presentation"; Vaperma, Inc.; Mar. 2010; (32 pages).

(Continued)

*Primary Examiner* — Jonathan Luke Pilcher
(74) *Attorney, Agent, or Firm* — K&L Gates LLP

(57) ABSTRACT

A distillation and dehydration system is provided that produces an anhydrous organic solvent. The provided system includes vapor recompression (e.g., a mechanical or thermal vapor recompression unit) to recover heat from a rectification-distillation section (e.g., a rectifier/stripper column). The addition of vapor recompression enables further heat recovery within a stream by increasing the condensation temperature and pressure of that stream and later using its latent heat by condensing it.

14 Claims, 17 Drawing Sheets

(56) References Cited

U.S. PATENT DOCUMENTS

| | | | |
|---|---|---|---|
| 4,422,903 A | 12/1983 | Messick | |
| 4,428,799 A | 1/1984 | Standiford | |
| 4,978,430 A | 12/1990 | Nakagawa et al. | |
| 5,105,029 A | 4/1992 | Ninomiya et al. | |
| 5,124,004 A | 6/1992 | Grethlein et al. | |
| 7,470,348 B2 | 12/2008 | Seiki et al. | |
| 7,572,353 B1 | 8/2009 | Vander Griend | |
| 7,594,981 B2 | 9/2009 | Ikeda | |
| 7,699,961 B2 | 4/2010 | Ikeda et al. | |
| 7,732,173 B2 | 6/2010 | Mairal et al. | |
| 7,744,727 B2 | 6/2010 | Blum et al. | |
| 7,867,365 B2 | 1/2011 | Brown | |
| 7,922,872 B2 | 4/2011 | Kihara et al. | |
| 8,103,385 B2 | 1/2012 | Macharia | |
| 8,114,255 B2 * | 2/2012 | Vane | C12P 7/06 203/16 |
| 8,128,787 B2 | 3/2012 | Wynn et al. | |
| 8,128,826 B2 | 3/2012 | Plante et al. | |
| 8,129,573 B2 | 3/2012 | Kikuchi et al. | |
| 8,142,662 B2 | 3/2012 | Osora et al. | |
| 8,425,733 B2 * | 4/2013 | Halvorsen | B01D 61/362 203/25 |
| 8,425,734 B2 | 4/2013 | Goel et al. | |
| 8,585,904 B2 | 11/2013 | Osora et al. | |
| 8,858,798 B2 | 10/2014 | Osora et al. | |
| 9,149,769 B2 | 10/2015 | Seiki et al. | |
| 9,194,623 B2 | 11/2015 | Kihara et al. | |
| 9,925,476 B2 | 3/2018 | Crawford et al. | |
| 9,989,310 B2 * | 6/2018 | Knight, Jr. | B01D 53/265 |
| 10,118,107 B1 | 11/2018 | Kwik et al. | |
| 10,267,511 B2 * | 4/2019 | Knight, Jr. | B01D 53/265 |
| 10,315,971 B2 | 6/2019 | King et al. | |
| 10,345,043 B2 * | 7/2019 | Knight, Jr. | F26B 25/007 |
| 10,392,590 B1 * | 8/2019 | Jakel | B01D 3/002 |
| 10,486,081 B2 * | 11/2019 | Lee | B01D 1/28 |
| 10,729,987 B1 | 8/2020 | Andrade et al. | |
| 10,787,407 B2 | 9/2020 | Crawford et al. | |
| 10,859,257 B2 * | 12/2020 | Knight, Jr. | F22B 1/14 |
| 11,291,927 B2 * | 4/2022 | Crawford | C10G 99/00 |
| 11,426,675 B2 | 8/2022 | Andrade et al. | |
| 2007/0000769 A1 | 1/2007 | Brown | |
| 2007/0131533 A1 | 6/2007 | Blum et al. | |
| 2008/0135396 A1 | 6/2008 | Blum | |
| 2008/0207959 A1 | 8/2008 | Plante et al. | |
| 2009/0004713 A1 | 1/2009 | Wynn | |
| 2009/0057128 A1 | 3/2009 | Vane et al. | |
| 2009/0117631 A1 | 5/2009 | Cote et al. | |
| 2009/0215139 A1 | 8/2009 | Datta et al. | |
| 2009/0301970 A1 | 12/2009 | Noel | |
| 2010/0051441 A1 | 3/2010 | Vane et al. | |
| 2010/0219128 A1 | 9/2010 | Seiki et al. | |
| 2010/0270139 A1 * | 10/2010 | Halvorsen | B01D 53/22 203/19 |
| 2010/0314320 A1 | 12/2010 | Osora et al. | |
| 2011/0108409 A1 | 5/2011 | Brown | |
| 2011/0130598 A1 | 6/2011 | Huang et al. | |
| 2011/0315541 A1 | 12/2011 | Xu | |
| 2012/0137727 A1 | 6/2012 | Huang | |
| 2013/0165678 A1 | 6/2013 | Kohl | |
| 2015/0087041 A1 | 3/2015 | Parten | |
| 2016/0107964 A1 | 4/2016 | Matsukata et al. | |
| 2016/0324205 A1 | 11/2016 | Herbst | |
| 2017/0203230 A1 | 7/2017 | Raiser | |
| 2017/0204030 A1 | 7/2017 | Maeda et al. | |
| 2017/0227287 A1 * | 8/2017 | Knight, Jr. | F26B 23/004 |
| 2017/0274297 A1 * | 9/2017 | Crawford | B01D 3/065 |
| 2018/0028934 A1 * | 2/2018 | Crawford | B01D 1/2856 |
| 2018/0031227 A1 * | 2/2018 | Knight, Jr. | F26B 23/02 |
| 2018/0172349 A1 * | 6/2018 | Knight, Jr. | F26B 25/005 |
| 2018/0290073 A1 | 10/2018 | Brown et al. | |
| 2019/0203928 A1 * | 7/2019 | Knight, Jr. | B01D 53/265 |
| 2019/0336882 A1 * | 11/2019 | Andrade | B01D 3/148 |
| 2020/0247738 A1 * | 8/2020 | Crawford | B01D 1/28 |
| 2021/0040509 A1 * | 2/2021 | Knight, Jr. | B01D 1/28 |

OTHER PUBLICATIONS

Gabardo, Helio "Dehydration of Ethanol Via Membrane Polymeric Siftek", Dec. 4, 2009 (34 pages).
Search Report and Written Opinion issued for International PCT Application No. PCT/IB2019/000546 filed on May 7, 2019.
PCT Search Report dated Feb. 20, 2023 issued for International PCT Application No. PCT/EP2022/078859.

* cited by examiner

HEAT INTEGRATED PROCESS AND SYSTEM FOR ETHANOL PRODUCTION USING VAPOR RECOMPRESSION

CROSS-REFERENCES TO RELATED APPLICATIONS

The present disclosure claims the benefit of and priority to U.S. Provisional Patent Application No. 63/256,116 titled "HEAT INTEGRATED PROCESS AND SYSTEM FOR ORGANIC SOLVENT PRODUCTION USING VAPOR RECOMPRESSION" and filed on Oct. 15, 2021, and to U.S. Provisional Patent Application No. 63/338,725 titled "HEAT INTEGRATED PROCESS AND SYSTEM FOR ORGANIC SOLVENT PRODUCTION USING VAPOR RECOMPRESSION" and filed on May 5, 2022, each of which is incorporated herein in its entirety.

BACKGROUND

To produce an organic solvent such as fuel grade ethanol, water and solids from fermentation must be removed. Typical processes use a series of distillation steps combined with a dehydration unit operation to achieve 99 vol. % or higher organic solvent content depending on specifications. To deliver an integrated system that provides low consumption of steam within the organic solvent production, different heat integration approaches have been implemented. These approaches include the use of a membrane for partial or full dehydration of a stream, such as a 120 P or 190 P stream, implementation of mechanical vapor recompression to further increase the heat recovery of vapor streams, and other different alternatives of heat integration within distillation, dehydration and evaporation.

SUMMARY

The present disclosure provides new and innovative systems and methods for organic solvent (e.g., ethanol) production that use vapor recompression. The addition of vapor recompression enables further heat recovery within a stream by increasing the condensation temperature and pressure of that stream and later using its latent heat by condensing it.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Figure 1:
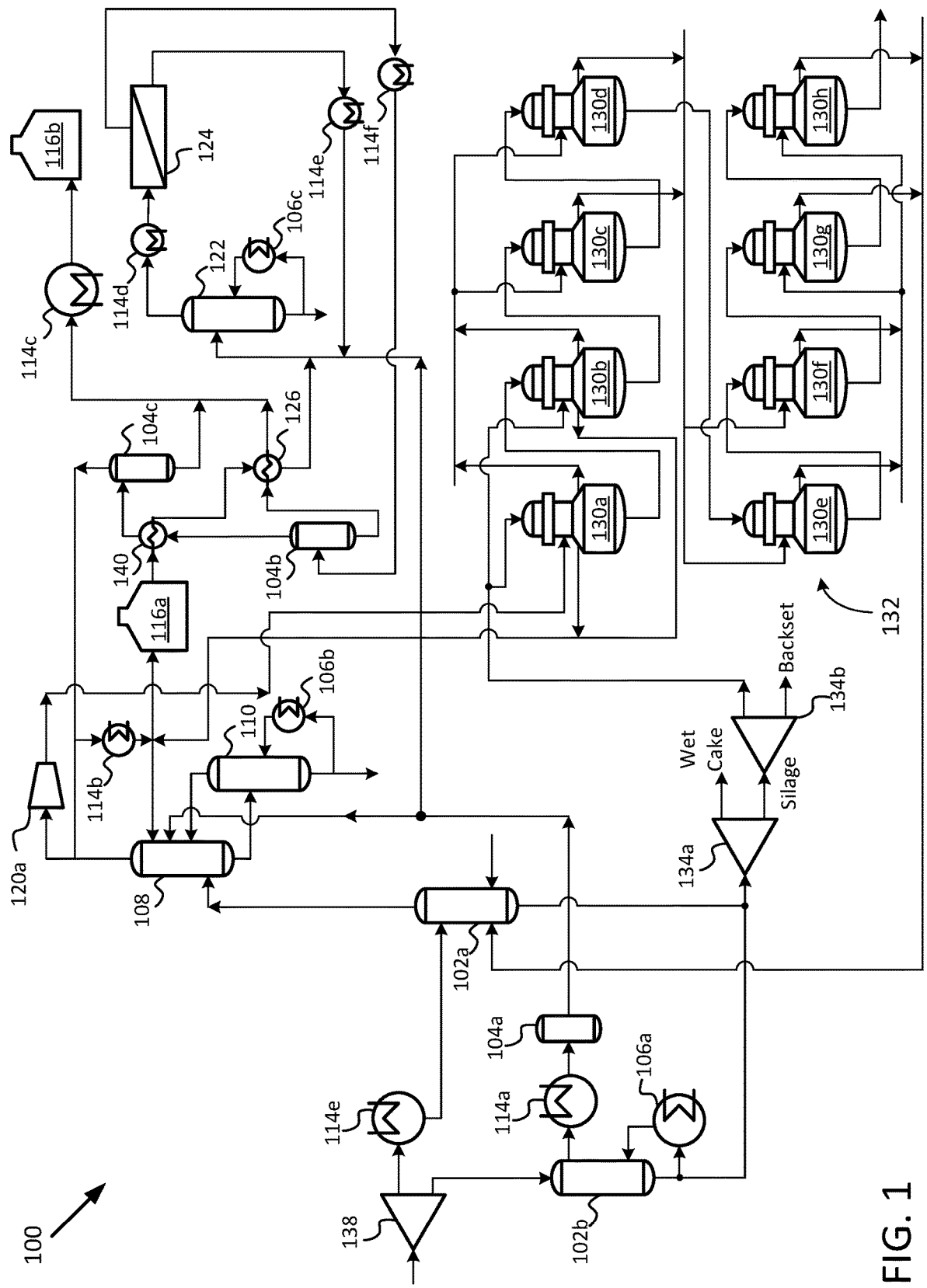
FIG. 1 illustrates an organic solvent production system with a separation system including a stripper column and a membrane that generates a retentate vapor which is condensed via a condenser, according to an aspect of the present disclosure.

The provided distillation and dehydration system is configured to produce an anhydrous organic solvent (e.g., >99% vol). In the following, the provided system is described in connection with the production of anhydrous ethanol. Ethanol, however, is merely an example and the following description applies equally to producing another suitable organic solvent using the provided systems and methods. For example, such suitable organic solvents may include isobutanol, isopropanol, ketones, etc.

Various purities of the organic solvent may be produced at different purity levels of the example production system. As used herein with respect to the examples given for ethanol, 120 proof (120 P), 190 proof (190 P), and 200 proof (200 P) are used for two purity levels for approximately at least 60% ethanol by volume, approximately at least 95% ethanol by volume, and at least 99% ethanol by volume, respectively, but other purity levels may be specified for use according to the present disclosure.

Additionally, various materials may be referred to herein as "freed" of another material (e.g., solids-freed, solvent-freed, water-freed), indicating that the first material has been distilled, filtered, or otherwise separated to remove (or be freed of) at least a portion of the second material. For example, a base liquid containing fifty percent water and fifty percent of an organic solvent (e.g., ethanol) may be subject to a first distillation process to produce a first water-freed stream of thirty percent water and seventy percent of the organic solvent, which may be subject to a second distillation process to produce a second water freed-stream of ten percent water and ninety percent of the organic solvent. In contrast, various materials may be referred to herein as "enriched" with another material (e.g., solvent enriched), indicating that the first material has been distilled, filtered, concentrated, or otherwise supplemented to increase a concentration of the second material. Using the previous examples, the water-freed streams may also be considered to be solvent enriched streams, and the remaining base material (from which the solvent enriched streams were separated) may be considered to be water enriched streams in comparison to their respective inputs.

The provided system includes vapor recompression (e.g., a mechanical or thermal vapor recompression unit) to recover heat from a rectification-distillation section (e.g., a rectifier/stripper column). The addition of vapor recompression enables further heat recovery within a stream by increasing the condensation temperature and pressure of that stream and later using its latent heat by condensing it. Vapor recompression units compress a vapor from a lower pressure to a higher pressure. Examples include compressors driven by engines, driven by electrical energy and motors (both referred to as MVR or mechanical vapor recompression units), or thermal vapor recompression units that forgo electrical power and instead use motive steam to entrain and compress the lower pressure vapor to a higher pressure (e.g., a steam jet pump). Although the examples given herein may recite one type of compressor using one type of power source, different power sources or types of compressors can be used in a system design according to the operational constraints of the system. The energy savings provided by the addition of a vapor recompression unit in an organic solvent plant can be substantial when compared to the energy necessary to produce the steam that will be used in the plant.

Various components of the presently disclosed systems may be in fluid communication with one another, such as through piping. Two components in fluid communication with one another may be in direct fluid communication (e.g., piping directly connects the two components) or may have intermediate components or processing between the two components, such as filters, pumps, heaters, odor removal vessels, etc.

FIG. 1 illustrates an example organic solvent production system 100, such as an ethanol production system. In at least some aspects, the provided organic solvent production system 100 can be described as including five sections: (i) a feed stripping section, (ii) a rectifying-distillation section, (iii) a compression section, (iv) a dehydration section, and (v) an evaporation section.

In the feed stripping section, feed, comprising of a mixture of organic solvent, water and solids, may be directed to at least one distillation column 102a-b (generally or collectively, distillation column 102 a beer column). For instance, the feed may be directed to a first distillation column 102a (BC 1), which thereby forms a solid free vaporous overhead stream and an organic solvent free bottoms stream. In some aspects, the provided system may include a second distillation column 102b (BC 2), which requires splitting the feed in two portions by a splitter 138 (e.g., a centrifuge, valve, Y-joint, etc.). In such aspects, the first portion may be directed to the first distillation column 102a which thereby forms a solid free vaporous overhead stream and an organic solvent free bottoms stream. The second portion may be directed to the second distillation column 102b which thereby forms a solid free vaporous overhead stream and an organic solvent free bottoms stream. In some aspects, the first distillation column 102a may operate at a different (higher or lower) pressure than the second distillation column 102b. In some aspects, the one or both of the portions may be preheated before reaching the respective distillation column 102 by a preheater heat exchanger 114e (generally or collectively, heat exchanger 114).

In some aspects, the first distillation column 102a may be driven by process vapors through direct injection, such as vapors from one or more evaporators 130a-h (generally or collectively, evaporators 130 or evaporator systems) in the evaporation section 132. In some aspects, the first distillation column 102a may be driven by vapors from process streams generated in flash vessels 104a-d (generally or collectively, flash vessel 104). In some aspects, the first distillation column 102a may be driven by cook flash vapors. For instance, in the example illustrated in FIG. 1, the first distillation column 102a is driven by a combination of fourth effect vapors and cook flash. In other aspects, the first distillation column 102a may additionally or alternatively be driven by a beer column reboiler 106a-c (generally or collectively, reboiler 106), such as is illustrated for the second distillation column 102b in FIG. 1, with a combination of either evaporator vapors, cook flash, vapors generated from flashing a portion of the second distillation column organic solvent free bottoms stream, or other process streams.

In some aspects having the second distillation column 102b, the second distillation column 102b may be driven by process vapors through direct injection. In other aspects, the second distillation column 102b may additionally or alternatively be driven by steam through a beer column reboiler 106. For example, in the illustrated aspect, the second distillation column 102b is driven only by a beer column reboiler 106a. In some instances, steam condensate from the beer column reboiler 106a is flashed in a flash vessel 104. In such instances, the low pressure steam generated by the flash vessel 104 may be used to drive the reboiler 106b of the side stripper column 110 in the rectifying distillation section and/or heat an overhead stream of the rectifier column 108, or may be used to heat any other suitable stream having a lower temperature.

In at least some aspects, the vaporous overhead stream of the first distillation column 102a may be directed straight (e.g., without any intervening components) to the rectifying distillation section. For instance, the vaporous overhead stream of the first distillation column 102a may be directed straight to a rectifier column 108. Stated differently, the vaporous overhead stream of the first distillation column 102a may be introduced into the rectifier column 108 as a vapor without first being condensed. As described in more detail below in relation to the rectifying-distillation section, the rectifying-distillation section may include a rectifier/stripper column 112 (FIG. 1A) or, as shown in FIG. 1, a rectifier column 108 in fluid communication with a side stripper column 110. As such, references made to a rectifier column 108 and/or a side stripper column 110 may alternatively be a rectifier/stripper column 112.

The vaporous overhead stream of the second distillation column 102b may be condensed. In some aspects, the vaporous overhead stream of the second distillation column 102*b* may be condensed via a condenser 140. In one example, the first distillation column 102*a* may operate at a higher pressure than the second distillation column 102*b* and the vaporous overhead stream of the second distillation column 102*b* may be condensed via a condenser 140. In other aspects, the vaporous overhead stream of the second distillation column 102*b* may be condensed via one or more evaporators 130 in the evaporation section 132. In one example, the first distillation column 102*a* may operate at a lower pressure than the second distillation column 102*b* and the vaporous overhead stream of the second distillation column 102*b* may be condensed via one or more evaporators 130 in the evaporation section 132. In some aspects, the condensed overhead stream of the second distillation column 102*b* may be directed to a separation system of the dehydration section. In other aspects, the condensed overhead stream of the second distillation column 102*b* may be directed to a rectifier column 108 of the rectifying distillation section. In other aspects still, a first portion of the condensed overhead stream of the second distillation column 102*b* may be directed to the separation system while a second portion of the condensed overhead stream of the second distillation column 102*b* may be directed to the rectifier column 108.

The bottom stream of the first distillation column 102*a* may be directed to the evaporation section 132. At least a portion of the organic solvent free bottom stream of the second distillation column 102*b* may be directed to the evaporation section 132. For instance, in the illustrated example of FIG. 1, the bottom streams of both the first distillation column 102*a* and the second distillation column 102*b* are directed to the evaporation section 132. In some instances, a portion of the bottom stream of the second distillation column 102*b* may be directed to the evaporation section via a flash vessel 104*a* and/or a heat exchanger 114*a-g* to recover its sensible heat. The various heat exchangers 114 discussed herein may be used to adjust (e.g., heating or cooling) the temperature of a first medium by exchanging heat with a second medium of a different temperature, thereby affecting the opposing temperature adjustment on the second medium. In some aspects, a portion of the bottom stream of the second distillation column 102*b* may be directed to the first distillation column 102*a*. In some aspects, a portion of the bottom stream of the second distillation column 102*b* may be directed to a flash vessel 104 where vapors generated are directed to the evaporator vapors to drive the first distillation column 102*a* or rectifier column 108. In some aspects, a remaining liquid portion resulting from flashing the portion of the bottom stream from the second distillation column 102*b* may exchange heat with another process stream prior to being directed to the evaporation section 132.

Figure 1A:
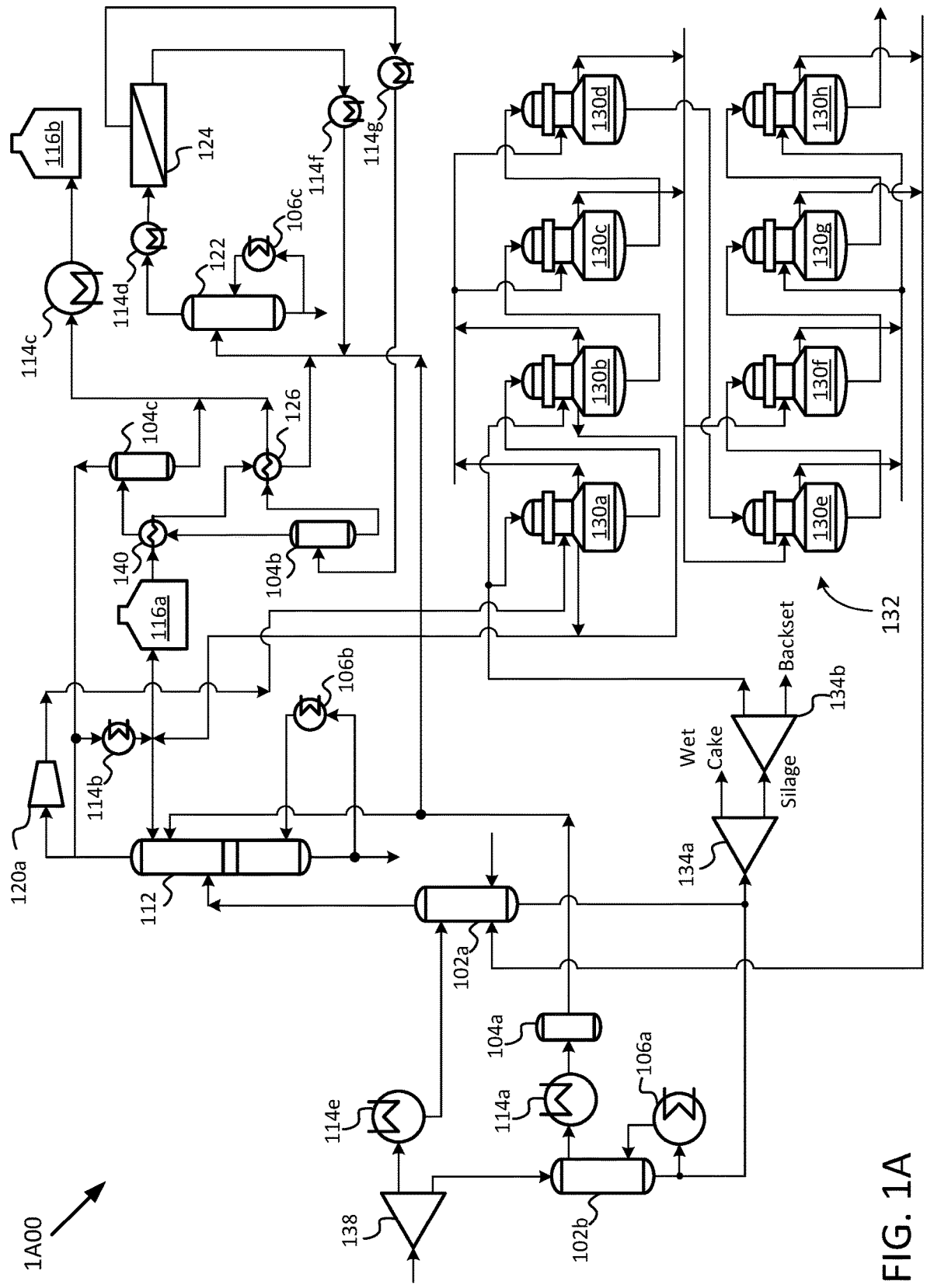
FIG. 1A illustrates an organic solvent production system with a separation system including a single rectifier/stripper column, according to an aspect of the present disclosure.

In at least some aspects, the rectifying distillation section may include a rectifier/stripper column 112 (FIG. 1A). The rectifier/stripper column 112 may be a single distillation unit in which both rectification and stripping happens. In some aspects, the rectifier/stripper column 112 may be a rectifier column 108 in fluid communication with a separate side stripper column 110. While some of the figures show the rectifier/stripper column 112 as a separate rectifier column 108 and side stripper column 110, it should be appreciated that the following description applies equally to a single integrated rectifier/stripper column 112. For instance, streams described as being directed to or from the rectifier column 108 or to the side stripper column 110 may be directed to or from a single rectifier/stripper column 112.

In various embodiments, the vaporous overhead stream from the first distillation column 102*a* may be directed straight to the rectifier column 108, which thereby forms an organic solvent-rich overhead stream and a bottom stream. The rectifier bottom stream may be directed to the side stripper column 110 in some aspects, which may thereby form an overhead stream directed back to the rectifier column 108 and an organic solvent-free bottom stream. The organic solvent-free bottom stream may be directed to another area of the organic solvent production plant (e.g., the cook section) in which the provided system is located. In some aspects, the side stripper column 110 may be driven by direct vapor injection and/or steam. In other aspects, the side stripper column 110 may be driven by process vapors or steam via a reboiler 106*b*. In some examples, a first portion of the organic solvent-free bottom stream generated by the side stripper column 110 may be directed to a reboiler 106 driven by either steam or process flash vapors and a second portion of the organic solvent-free bottom stream may be forwarded to a front end of the organic solvent production plant in which the provided system is located.

In various aspects, the organic solvent-rich overhead stream formed by the rectifier column 108 may be any concentration below the Azeotropic concentration. In one example, the rectifier overhead stream may be 190-proof (190 P). A portion of the rectifier overhead stream may be condensed, such as via a condenser 140. In some aspects, at least a portion of the condensed rectifier overhead stream may be directed to a storage tank 116*a-e* (generally or collectively, storage tank 116). In some aspects, a portion of the condensed rectifier overhead stream may return to the rectifying section as a reflux stream. At least a portion of the condensed rectifier overhead stream may be directed (e.g., via the storage tank 116*a*) to a separation system of the dehydration section. For instance, a portion of the condensed rectifier overhead stream may be directed to a stripper column 122 or a vaporizer 118 of the separation system.

At least a portion of the rectifier overhead stream may be directed to a vapor recompression unit 120*a-c* (generally or collectively, vapor recompression unit 120) of the compression section. The vapor recompression unit 120*a* may be configured to compress the portion of the rectifier overhead stream thereby generating a vaporous compressed rectifier overhead stream. In various aspects, a vapor recompression unit 120 may include a compressor or jet pump that is used to compress, and thus increase the pressure of, a vapor received by the vapor recompression unit 120 to produce a compressed vapor at higher pressure.

In some examples, the vapor recompression unit 120 may be a mechanical vapor recompression unit. A mechanical vapor recompression unit uses an electrically driven compressor. Typical compressors that can be used include rotary lobe positive displacement compressors (also known as Roots type blower from Roots System), centrifugal turbo compressors, centrifugal fans or axial compressors. As an example, a typical rotary lobe positive displacement compressor functions with two intermeshing rotors mounted on parallel shafts. The two rotors rotate in opposite directions. As each rotor passes the blower inlet, a definite volume of vapor/gas is trapped (e.g., the displaced volume) and this trapped vapor/gas is carried around the casing to the blower outlet. As each rotor passes the blower outlet, at that point, the gas/vapor is compressed to the desired system pressure and is expelled. Which compressor type is suitable can depend on the operating conditions (e.g., required pressure, volume flow, etc.) of the application for which the mechanical vapor recompression unit is used.

In some examples, the vapor recompression unit 120 may be a thermal vapor recompression unit. A thermal vapor recompression unit is based on the steam jet pump principle which compresses low pressure steam/vapor (e.g., flash vapors or evaporator effect vapors) by using a portion high pressure steam, also referred to as motive steam, to produce intermediate pressure steam/vapor that can be used as a heating medium (e.g., distillation heating).

In various aspects, the compressed rectifier overhead stream may be directed entirely to one or more evaporators 130 of the evaporation section 132. For instance, the compressed rectifier overhead stream may be directed entirely to a first evaporator 130a 1 (e.g., as in FIG. 2). In another instance, a portion of the compressed rectifier overhead stream may be directed to a first evaporator 130a while another portion is directed to a second evaporator 130b (e.g., as in FIG. 1). The compressed rectifier overhead stream may be condensed by one or more evaporators 130 in the evaporation section 132, thereby cascading energy between distillation and evaporation. Such energy cascading helps to reduce (or eliminate) steam consumption in evaporation as compared to typical systems that are heavily dependent upon steam to drive evaporation, which therefore reduces energy consumption of the provided system compared to typical systems. In some aspects, the compressed rectifier overhead stream directed to the evaporation section 132 may return as a reflux to the rectifier column 108.

In some aspects, a portion of the compressed rectifier overhead stream may be directed to the dehydration section, such as to the stripper column 122 or to a vaporizer 118. In such aspects, the portion of the compressed rectifier overhead stream directed to the dehydration section may be further compressed via one or more compression stages (e.g., one or more separate vapor recompression units 120) prior to being introduced to the dehydration section. One particular example of the provided system includes a portion of the compressed rectifier overhead stream being directed to the evaporation section 132 while another portion of the compressed rectifier overhead stream is directed to the dehydration section.

Figure 2:
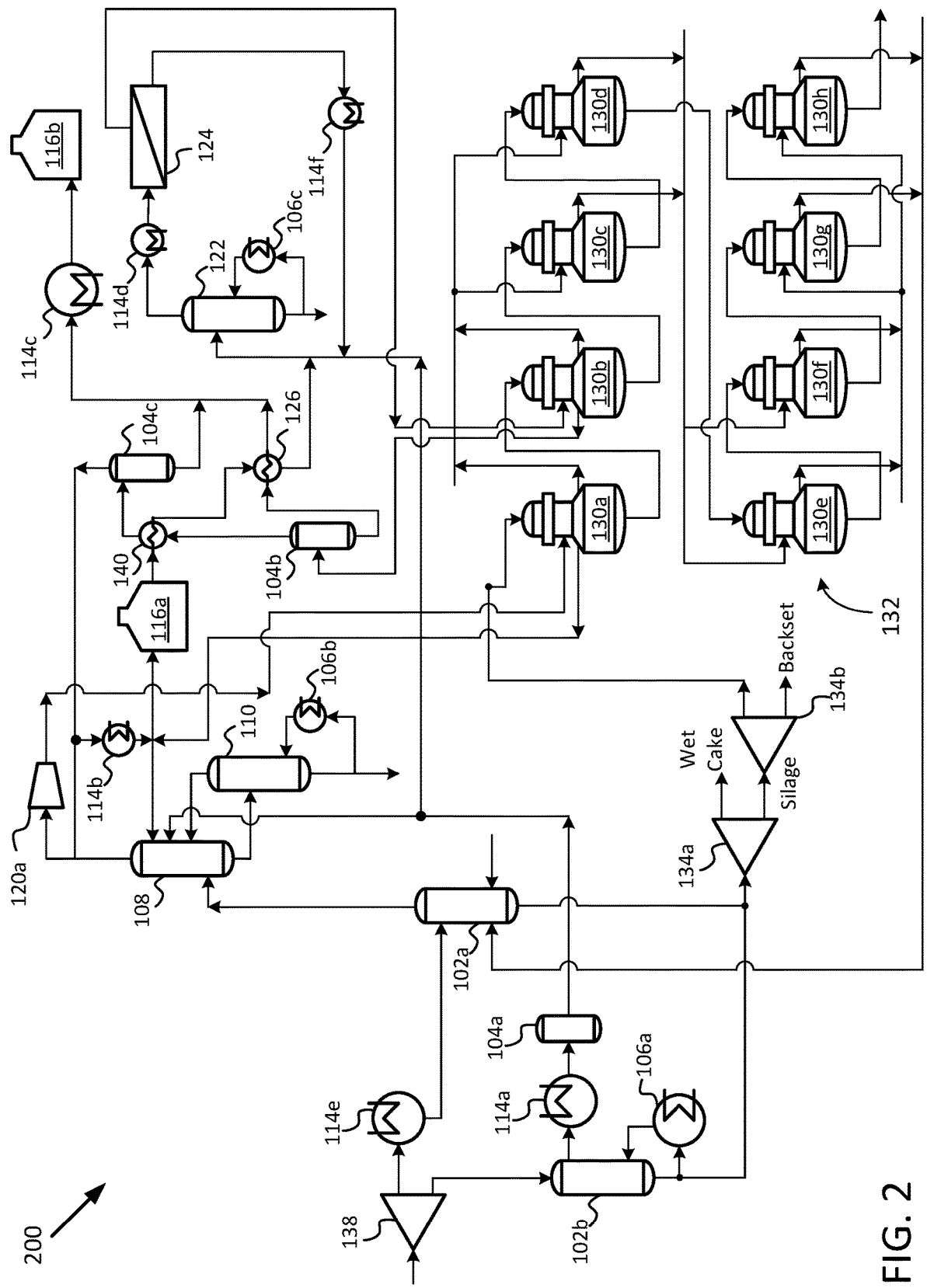
FIG. 2 illustrates an organic solvent production system with a separation system including a stripper column and a membrane that generates a retentate vapor which is condensed via one or more evaporators, according to an aspect of the present disclosure.

As described further in connection with FIG. 2, the portions of the rectifier overhead stream that are condensed or compressed may be varied. For instance, the portion of the rectifier overhead stream that is compressed may depend on the energy required to drive evaporation, with the remaining rectifier overhead stream being condensed. As such, the condenser 140 may or may not be operational in various aspects.

In at least some aspects, the dehydration section includes a separation system. In the example system of FIG. 1, the separation system may include a stripper column 122 and a membrane 124 (e.g., a semi-permeable membrane). The stripper column 122 generates an overhead vapor stream from an organic solvent-water concentrated feed stream that is directed to contact the membrane 124. The stripper column 122 may also generate a bottom stream that may be directed to another area of the organic solvent production plant in which the provided system is located. In various aspects, the stripper column bottom stream may be used to heat a suitable cold stream (e.g., steam condensate, process water, scrubber water, 190 P, a regenerate stream, a beer feed stream, etc.). In some aspects, the stripper column 122 may be driven by a reboiler 106c. In some examples, steam condensate from the stripper column reboiler 106c is flashed in a flash vessel 104. In such examples, the low pressure steam generated by the flash vessel 104 may be used to drive the reboiler 106b of the side stripper column 110 in the rectifying distillation section and/or heat the overhead stream of the rectifier column 108, or may be used to heat any other suitable stream having a lower temperature.

The membrane 124 continuously removes water from the organic solvent-water concentrated feed stream to produce a vaporous water-rich stream (permeate) and a vaporous anhydrous organic solvent-rich stream (retentate). For example, the vaporous anhydrous ethanol-rich stream may include 99% by volume or higher of organic solvent. In some aspects, the membrane 124 may be a polymer membrane. The polymer membrane 124 may be built on hollow fibers. A selective layer may be placed on either the outside (e.g., shell side) or the inside (e.g., lumen side) of the hollow fibers. In other examples, the membrane 124 may have other suitable forms that suitably dehydrate a feed vapor stream as part of a high-grade organic solvent production process, such as tubular membranes including zeolites membranes or spiral wound membranes.

In at least some aspects, retentate vapor generated by the membrane 124 in the separation system may be condensed. For instance, the retentate vapor may be condensed via a condenser 140 against any cold stream available. In other instances, the retentate vapor may be condensed via one or more of the evaporators 130 in the evaporation section 132. The condensed retentate liquid may be directed to a tank 116b (e.g., a 200 P tank) for storage. In some aspects, prior to the condensed retentate liquid reaching the tank 116b, the condensed retentate may be directed to a flash vessel 104b where the produced 200-proof flash vapor stream can recover its heat elsewhere and be directed to a $CO_2$ removal system. The $CO_2$ removal system is a low-pressure flash vessel 104c in which vapor and a liquid stream are generated. The vapor stream is directed to a 190-proof heat exchanger 114b and the liquid stream is directed into the condensed retentate stream. In some instances of the provided system, the condensed retentate from the 200 P flash vessel 104b is directed to an economizer 126. Retentate liquid energy may be further recovered against other process streams (e.g., permeate liquid, scrubber bottoms). For example, the retentate liquid may heat both the permeate liquid in a heat exchanger 114 and scrubber bottoms in a heat exchanger 114.

In various examples, the permeate vapor generated by the membrane 124 in the separation system may be condensed. For instance, the heat available in the permeate vapor may be used to heat a suitable cold stream (e.g., steam condensate, process water, scrubber water, 190 P, a regenerate stream, a beer feed stream, etc.) at a condenser 140, thereby condensing the permeate vapor into a liquid.

In some examples, such as the one illustrated in FIG. 1, the condensed permeate liquid may be directed back to the stripper column 122. The permeate liquid may be heated by a suitable hot stream (e.g., flash vapors, side stripper bottom stream, stripper column bottom stream, retentate liquid, etc.) at a heat exchanger 114 prior to being introduced into the stripper column 122 in some aspects. For instance, the permeate liquid may be heated by the retentate liquid at the heat exchanger 114.

The use of membrane dehydration with vapor recompression can have advantages over the use of molecular sieve units 128 (MSUs). For instance, the use of membrane dehydration can provide an organic solvent plant with: (i) a stable and continuous distillation section by elimination of the molecular sieves regenerate streams, (ii) continuous operation compared to cyclic operation for regeneration of molecular sieves, (iii) a steady rectifier overhead stream flow that can then be used by a vapor recompression unit to allow for its heat recovery, (iv) a lower energy consumption in distillation by removing the treatment of additional streams from MSUs 128 such as regen, and (v) a system that is modular and, therefore, easy to increase capacity by introducing additional cartridges of membranes 124.

In various aspects, the evaporation section 132 includes an evaporation system of one or more evaporators 130. In some aspects, the one or more evaporators 130 may be configured for multi-effect evaporation. For instance, vapors generated from a first effect evaporator 130a may be used to drive a second effect evaporator 130b. In some aspects, vapors generated from the second-effect evaporator 130b may be used to drive a third-effect evaporator 130c. In various aspects, the number of evaporation steps vary from two to eight (e.g., including in a cascading arrangement a fourth-effect evaporator 130d, fifth-effect evaporator 130e, etc.). As the number of evaporation effects is increased, the energy required to drive the evaporation (e.g., drive the first-effect evaporator) is decreased. One advantage of the evaporators 130 being configured for multi-effect evaporation is that it reduces the amount of the rectifier overhead stream that needs to be condensed in order to drive energy demands of the evaporation system. For instance, in one example, only an amount of the rectifier overhead stream required to drive the first-effect evaporator 130a of the evaporation system is compressed and directed to the first-effect evaporator 130a, thereby enabling cascading of energy in the multi-effect evaporator configuration.

In various aspects, effect vapors from evaporators 130 may be used to drive the distillation system. In one example, fourth effect vapors from a fourth effect evaporator 130d may be used to drive the first distillation column 102a.

In at least some aspects, the decrease in energy required to drive the evaporation helps enable the compressed rectifier overhead stream generated by the vapor recompression unit 120a to drive evaporation. In some instances, without the one or more evaporators 130 being configured for multi-effect evaporation, the energy demand to drive the evaporation section 132 might require large, possibly infeasible, vapor recompression systems in order to generate a compressed rectifier overhead stream sufficient to drive the one or more evaporators 130.

In some aspects, the provided system may include the second distillation column 102b. In such aspects, the second distillation column 102b can help enable the provided system to break the codependence between evaporation and feed stripping. This, in turn, can help allow for optimization/reconfiguration of evaporators 130 to produce multi-effect evaporation (e.g., third or fourth-effect evaporation), although multi-effect evaporation can be achieved through system configurations including only the first distillation column 102a as well, such as by addition a reboiler 106 to drive the first distillation column 102a.

In the evaporation section 132, the bottom stream of the first distillation column 102a and/or the bottom stream of the second distillation column 102b may be subjected to a centrifuge system 134a-b (generally or collectively, centrifuge system 134) in which a concentrated solids (wet cake) and a low-solids concentration solution (thin stillage) are produced. The thin stillage may then be split into two streams: backset and evaporator feed. An advantage of the provided system is that backset and evaporator feed ratios can be adjusted and the recycle of backset to the front-end of the plant can be reduced, which improves plant yields and efficiency. The evaporator feed is subjected to the evaporator section 132 to increase its solids concentrations. In some aspects, the evaporator feed may receive beer column overhead vapors to drive evaporation in at least one evaporator 130. In at least some aspects, retentate vapor from the separation system in the dehydration section may be used to drive the evaporation section 132. In some instances, vaporous overhead stream from a distillation column 102 (e.g., the overhead stream of the second distillation column 102b) may be used to drive the evaporation. One advantage of the provided system is that it eliminates the need for steam to drive the evaporation section 132.

FIG. 2 illustrates an alternative embodiment of the example system of FIG. 1. Only the differences between the example organic solvent production system of FIG. 1 and the organic solvent production system of FIG. 2 are described herein. In the example system 200 of FIG. 2, retentate vapor generated by the membrane 124 is directed to the evaporation section (e.g., to the second evaporator 130b). In other examples, the retentate vapor may drive more than one evaporator 130 or may be directed to a different evaporator 130 (e.g., an evaporator other than the second evaporator 130b) in the evaporation section 132. In at least some aspects, the retentate vapor is directed to a different evaporator 130 than the compressed rectifier overhead stream. For instance, in the illustrated example, with the retentate vapor driving the second evaporator 130b, the compressed rectifier overhead stream can now be directed entirely to the first evaporator 130a, rather than being directed to both the first evaporator 130a and second evaporator 130b as in FIG. 1. Stated differently, less of the compressed rectifier overhead stream is directed to the evaporation section 132 given that the retentate vapor is directed to the evaporation section 132. With less compressed rectifier overhead stream being used to drive evaporation, a greater portion of the rectifier overhead stream may be condensed via the condenser 140 rather than being compressed. One advantage of less compressed rectifier overhead stream being used to drive evaporation is that the vapor recompression unit 120 may be smaller and less energy demanding.

Figure 3:
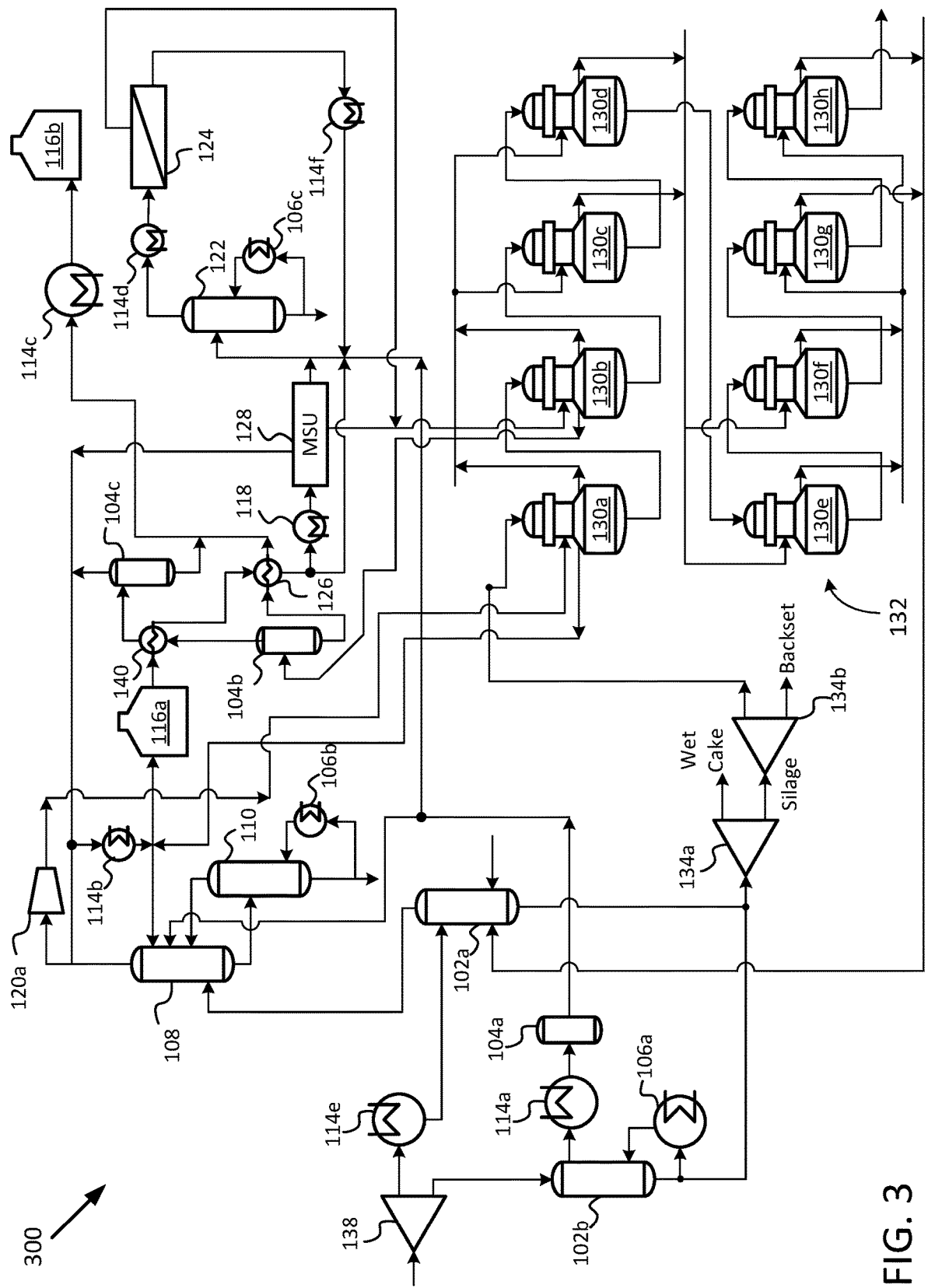
FIG. 3 illustrates an organic solvent production system with a separation system including both MSU dehydration and a membrane dehydration system, according to an aspect of the present disclosure.

FIG. 3 illustrates an alternative embodiment of the example system of FIG. 1. Only the differences between the example organic solvent production system of FIGS. 1 to 2 and the organic solvent production system 300 of FIG. 3 are described herein. In the example system 300 of FIG. 3, the dehydration section may include both (1) a vaporizer 118 and a set of molecular sieve beds (e.g., an MSU 128) and (2) a stripper column 122 and a membrane 124. A portion of the condensed rectifier overhead stream may be directed to the vaporizer 118. The vaporizer 118 generates a vaporized stream that is directed to the MSU 128. The set of molecular sieve beds of the MSU 128 are configured to generate a product stream and two regenerate streams from the vaporized stream. The two regenerate streams are a regen stream (MSU Regen) and a depressure stream. The product stream is an organic solvent-rich stream (e.g., 200-proof).

The MSU 128 may include two or three beds filled with zeolite pellets, which adsorb water to produce anhydrous vapor until the zeolite pellets are saturated with water. A saturated zeolite pellet bed may be regenerated. In some instances, freshly dehydrated organic solvent may be directed to contact a saturated zeolite pellet bed to remove water from the saturated zeolite pellet bed, which produces a regenerate stream. In other instances, the regeneration is done by vacuum generating two regenerate streams, the regen stream and the depressure stream. The MSU regen stream may have an organic solvent concentration between 50-80 vol % and therefore is recycled to upstream distillation for reprocessing. For example, the regen stream may be directed to the stripper column 122 of the separation system. The depressure stream may have a concentration above 80 vol % of organic solvent and may also be recycled to upstream distillation for reprocessing. For example, the depressure stream may be directed to the rectifier column 108 and/or the storage tank 116a storing a portion of the rectifier overheads. In instances in which the MSU 128 includes multiple zeolite pellet beds, a saturated zeolite pellet bed may be regenerated while an unsaturated zeolite pellet bed is used to dehydrate a vaporized feed stream. In at least some aspects, the product stream of the MSU 128 may be condensed (e.g., via one or more evaporators 130) and directed to a tank 116b for storage.

A portion of the condensed rectifier overhead stream (e.g., 190 P) may be directed to (e.g., via a storage tank 116a) the stripper column 122 which generates a vaporized stream that is directed to contact the membrane 124 as described in relation to FIG. 1.

Figure 4:
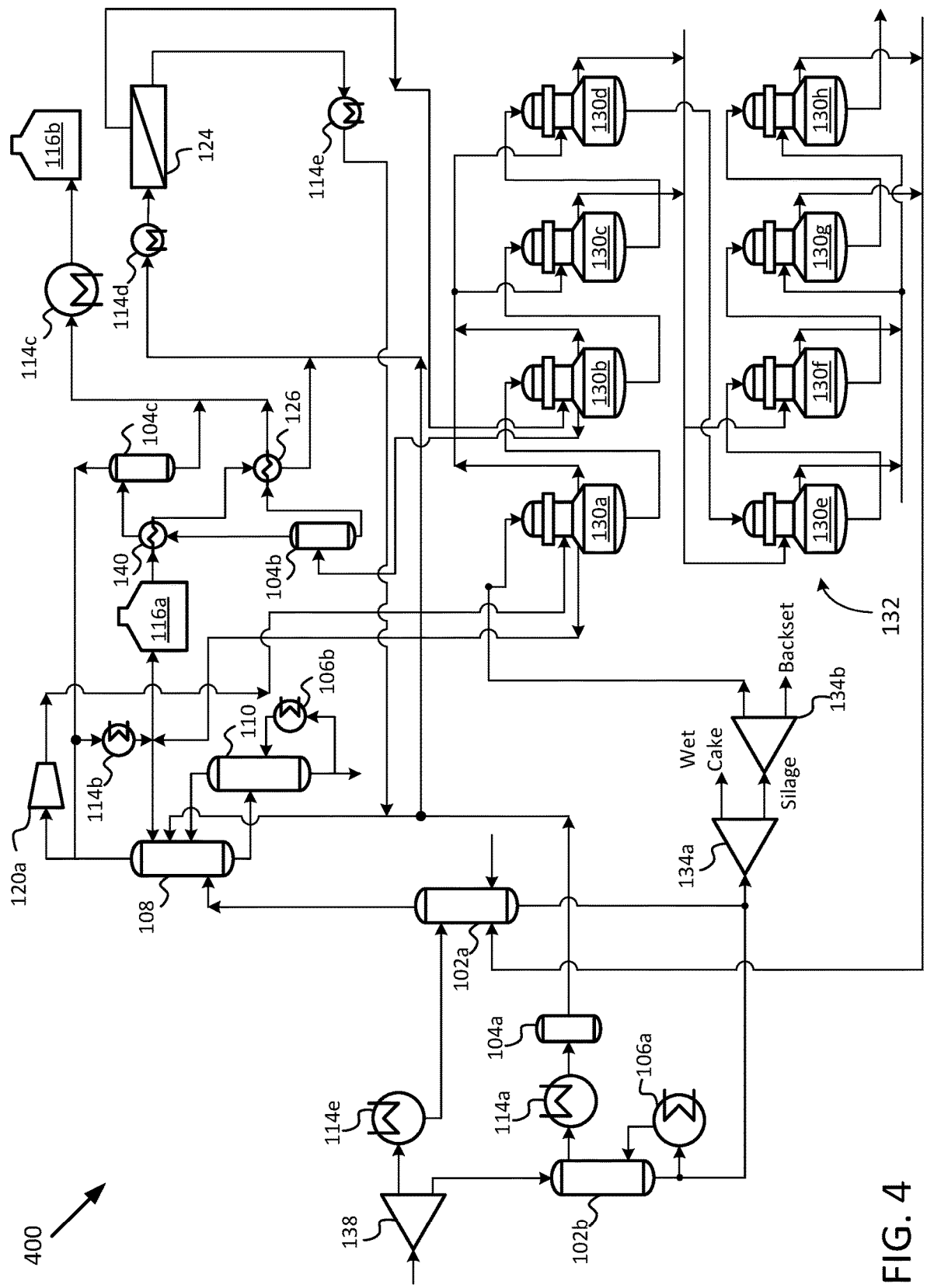
FIG. 4 illustrates an organic solvent production system with a separation system including a vaporizer and a membrane, according to an aspect of the present disclosure.

FIG. 4 illustrates an alternative embodiment of the example system of FIG. 1. Only the differences between the example organic solvent production system of FIGS. 1 to 3 and the organic solvent production system 400 of FIG. 4 are described herein. In the example system 400 of FIG. 4, the separation system may include a vaporizer 118 and a membrane 124. A portion of the rectifier overhead stream may be directed to the vaporizer 118. In some aspects, at least a portion of the second distillation column overhead stream may be directed to the vaporizer 118. The vaporizer 118 thereby generates a vaporized stream that is directed to contact the membrane 124.

Figure 5:
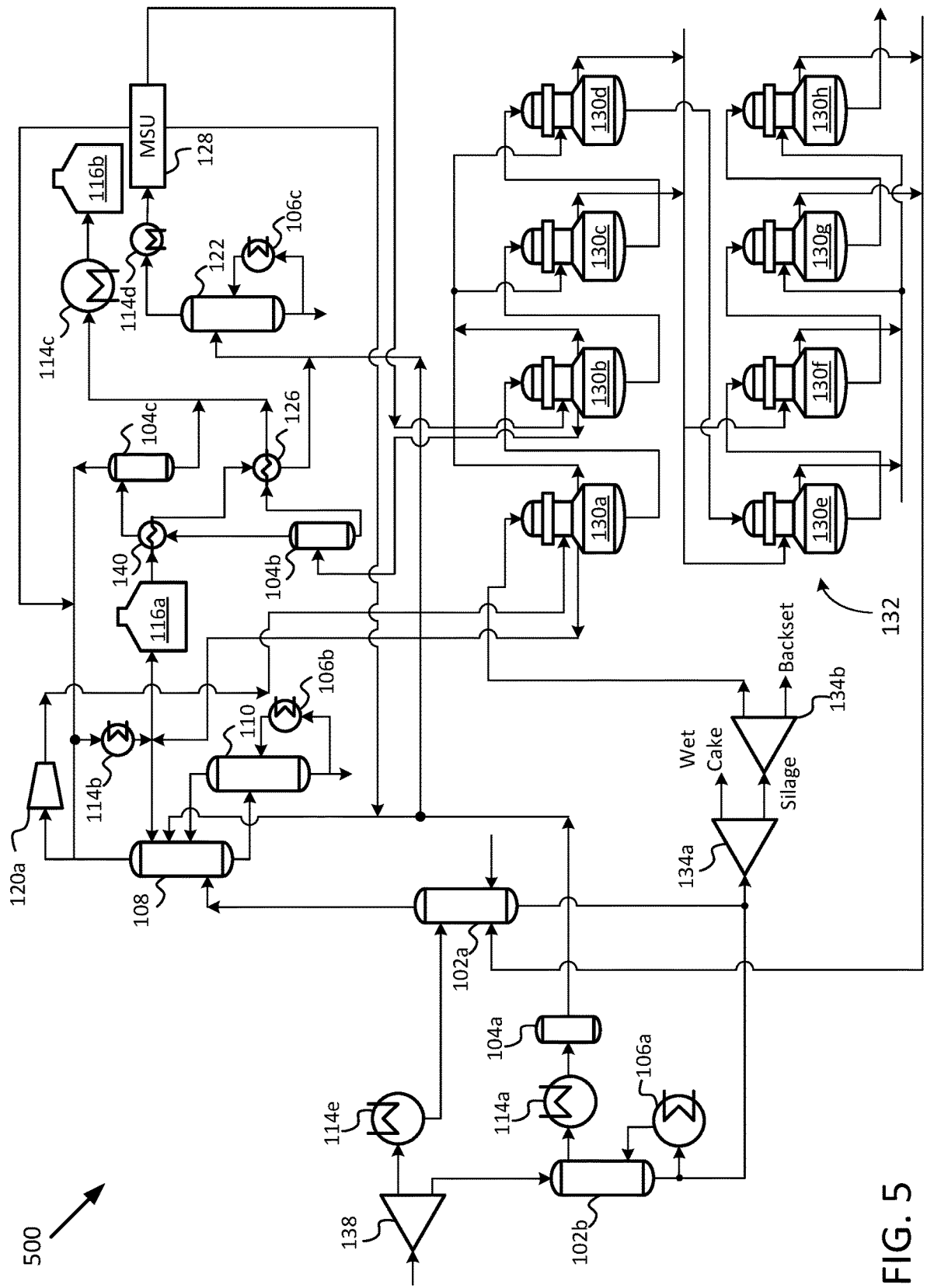
FIG. 5 illustrates an organic solvent production system including a stripper column and an MSU, according to an aspect of the present disclosure.

FIG. 5 illustrates an alternative embodiment of the example system of FIG. 1. Only the differences between the example organic solvent production system of FIGS. 1 to 4 and the organic solvent production system 500 of FIG. 5 are described herein. In the example system 500 of FIG. 5, the separation system may include a stripper column 122 and an MSU 128. A portion of the rectifier overhead stream may be directed to the stripper column 122. In some aspects, at least a portion of the second distillation column overhead stream may be directed to the stripper column 122. The stripper column 122 thereby generates a vaporized overhead stream that is directed to contact the MSU 128. The regen stream of the MSU 128 may be directed to the rectifier column 108.

Figure 6:
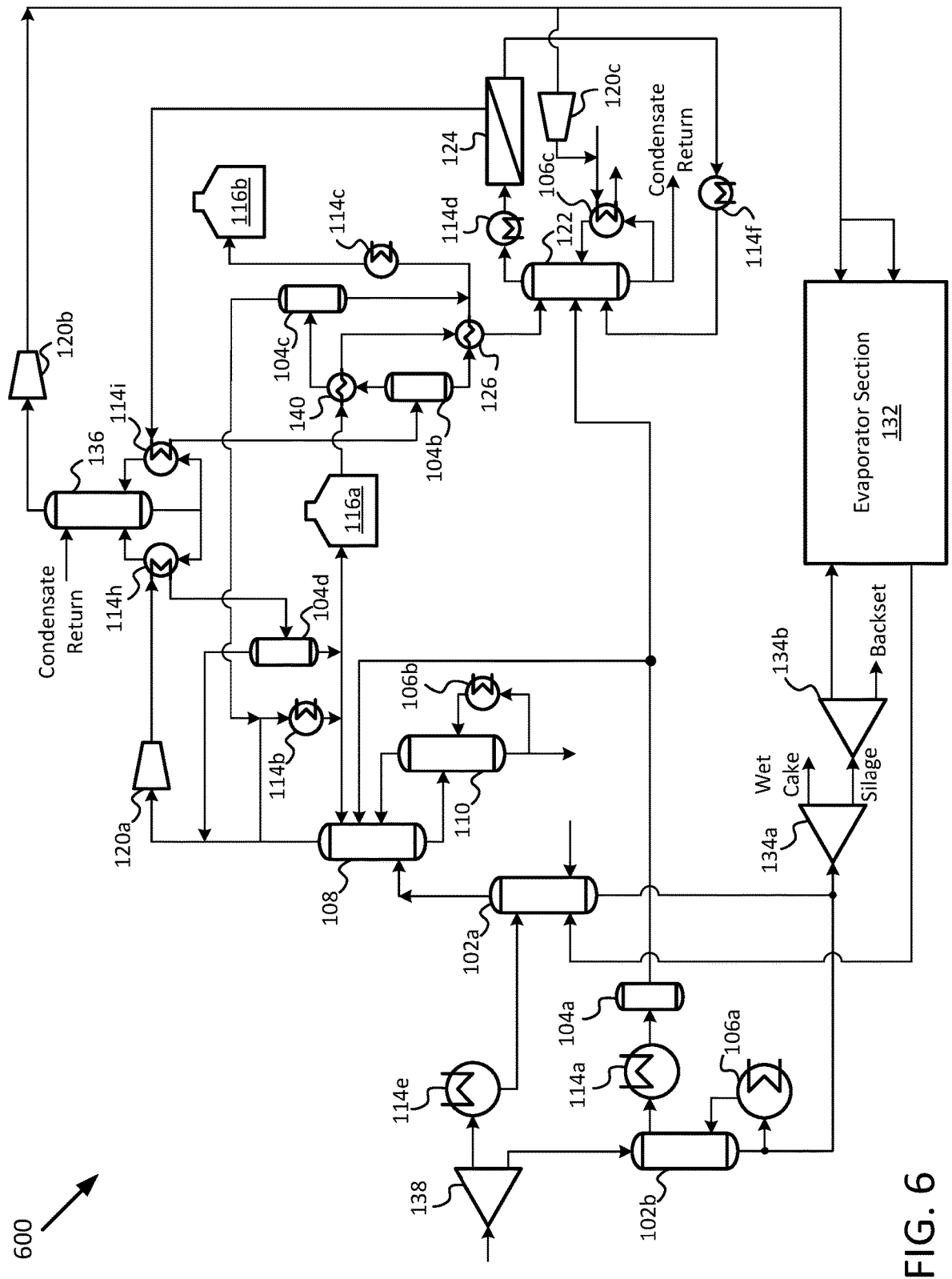
FIG. 6 illustrates an organic solvent production system including a heat recovery system, according to an aspect of the present disclosure.

FIG. 6 illustrates an alternative embodiment of the example system of FIG. 1. Only the differences between the example organic solvent production system 100 of FIG. 1 and the example organic solvent production system 600 of FIG. 6 are described herein. In the example system 600 of FIG. 6, the vapor recompression unit includes a steam condensate vessel 136 that includes a vapor-side heat exchanger 114i in fluid communication with the rectifier column 108, and a supplemental heat exchanger 114j in fluid communication with the membrane 124 to extract usable heat from the 190 P vapor and the retentate vapor respectively.

In various aspects, a vapor compressor 120a is disposed in the fluid pathway between the rectifier column 108 and the steam condensate vessel 136, which pressurizes the 190 P vapor to improve the efficiency at which usable thermal energy can be passed to the steam condensate vessel 136 via the vapor-side heat exchanger 114h. In some aspects, the vapor compressor 120 is a mechanical vapor recompression (MVR) compressor, although other types of compressors are contemplated such as, but not limited to, thermal vapor recompression (TVR) compressors that use a high pressure vapor as a motive vapor to compress the 190 P vapor. For example, a higher pressure vapor can be used motive steam can be used in an evaporator 130 to affect a higher pressure therein.

In various aspects, the pressure differential imparted on the 190 P vapor by the vapor compressor 120 in FIG. 6 to improve heat transfer is less than the pressure differential imparted by the condenser 140 in FIG. 1 to produce the return reflux stream. Because the 190 P vapor is combustible, using a lower compression ratio (and lower final pressure) can improve the overall safety of the system (as well as reducing cost and complexity of the compressors to install, operate, and maintain), but the lower pressure in the resulting compressed vapor can affect how readily the thermal energy can be transferred to various modules of the system. Therefore, the steam condensate vessel 136 provides an intermediate heat exchange with a non-combustible (or less combustible) working fluid that can extract thermal energy from a low pressure vapor and provide higher pressure vapor to other systems to transfer the thermal energy thereto. In some embodiments, in comparison to FIG. 1, when the 190 P vapor is passed to the steam condensate vessel 136 to extract usable thermal energy, the waste heat exchanger 114h in the return reflux stream may be omitted or regulated (e.g., via a valve assembly) to affect the amount of 190 P vapor that has heat vented to the environment rather than (or in addition to) exchanging heat with the working fluid in the steam condensate vessel 136.

The heat exchangers 114 in fluid communication with the steam condensate vessel 136 (e.g., a shell and tube heat exchanger, evaporator, etc.) receive a heated fluid or vapor from various modules of the system (e.g., the 190 P vapor from the rectifier column 108, the retentate vapor from the modules of the membrane 124, overheads from the distillation columns 102, permeate streams, etc.) and transfer the thermal energy to a working fluid (e.g., water), and return the cooled/condensed fluid or vapor to an appropriate module (e.g., via a reflux stream to the rectifier column 108, a retentate stream to a 200 P tank 116b). Although generally described as a steam condensate vessel 136 using water as the working fluid, in various aspects, the condensate vessel 136 may use various other working fluids. In various aspects, the steam condensate vessel 136 includes additional heaters that are in fluid communication with the condensate vessel 136 (e.g., evaporators, shell and tube exchangers, plate exchangers, etc.) that may impart additional thermal energy to the working fluid to supplement the thermal energy available via the heat exchangers 114.

The steam condensate vessel 136 produces, via the supplied thermal energy, a low pressure steam that a first steam compressor 120b then compresses to a medium pressure steam to transfer heat to other modules in the system (e.g., slurry tanks, distillation columns 102, evaporators 130, side stripper columns 110, stripper columns 122, cook water heaters, superheaters, vaporizers 118, hydroheaters, dryers, etc.). As illustrated in FIG. 6, the first steam compressor 120b supplies the medium pressure steam to the evaporators 130 to transfer thermal energy thereto. However, some modules in the system 600 may operate more effectively with a higher pressures (e.g., to receive a greater percentage of the available thermal energy in the working fluid) than the medium pressure steam produced by the first steam compressor 120b. Accordingly, the output feed from the first steam compressor 120b can be directly provided to various modules of the system (e.g., the evaporators 130) and indirectly provided to other modules via a second steam compressor 120c. The second steam compressor 120c may supply a higher pressure steam than is initially provided by the first steam compressor 120b to one or more modules of the system, such as the stripper column 122 illustrated in FIG. 6. For example, low pressure may include any pressure range less than 15 pounds per square inch absolute (psia), and high pressure may include any pressure range greater than 85 psia, while medium pressure includes any pressure range between the low pressure and high pressure ranges. In various aspects, the steam compressors 120b-c may be MVR or TVR compressors.

As illustrated in FIG. 6, the second steam compressor 120b provides a high pressure steam to the stripper column 122 via a heat exchanger used in a reboiler 106c, and the cooled steam then returns to the steam condensate vessel 136 as a steam condensate. Although generally described as a stripper column 122 receiving the high pressure steam, in various aspects, the high pressure steam may be provided to other modules (e.g., slurry tanks, distillation columns 102, evaporators 130, side stripper columns 110, cook water heaters, superheaters, vaporizers 118, hydroheaters, dryers, etc.) in addition or instead of the stripper column 122. Similarly, although generally described as supplying two different pressures of steam to two different modules of the system, the vapor recompression unit 120 may supply various different pressures of steam to various different numbers of modules in various aspects.

Figure 7:
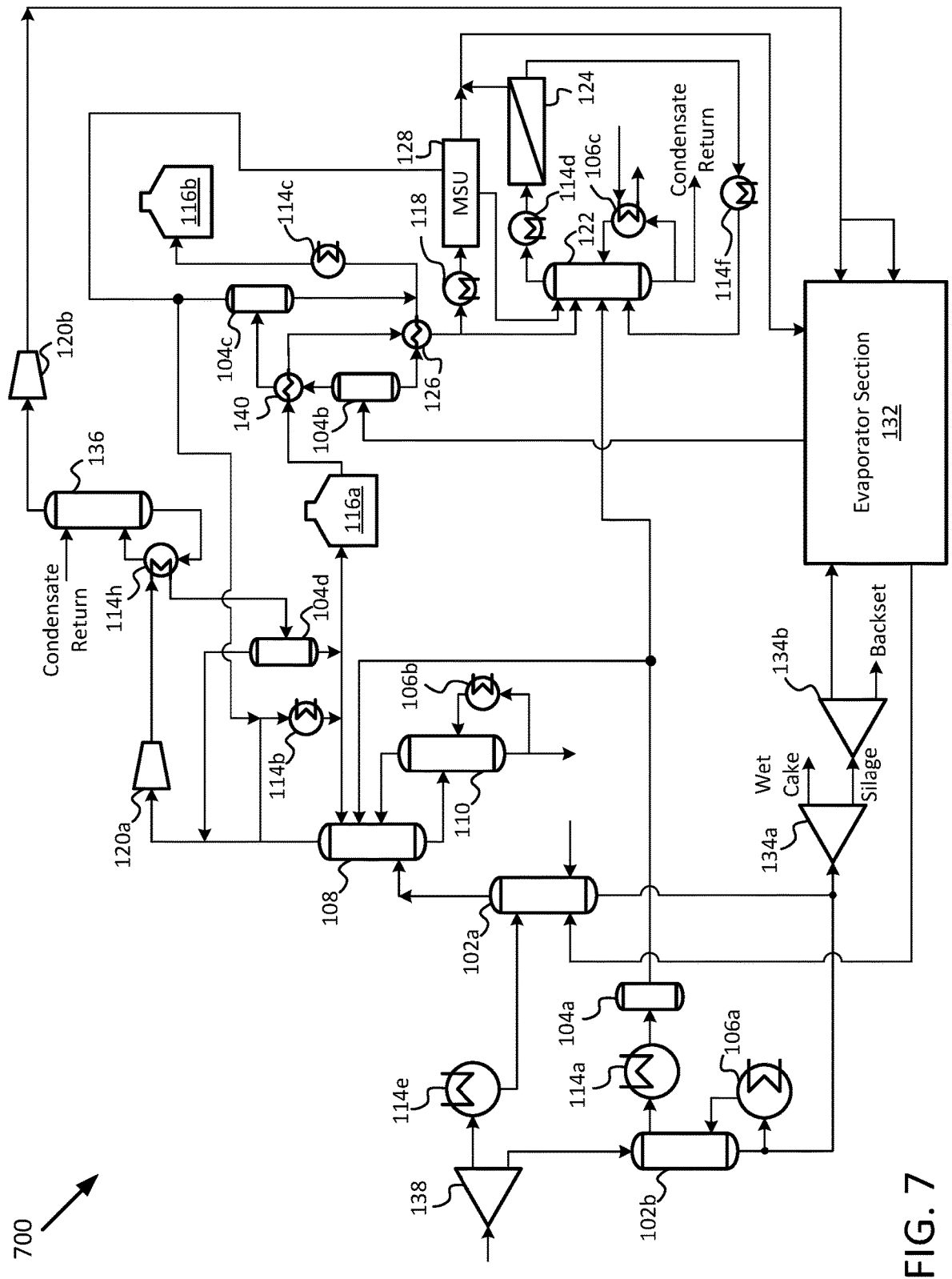
FIG. 7 illustrates an organic solvent production system including a heat recovery system, according to an aspect of the present disclosure.

FIG. 7 illustrates an alternative embodiment of the example system of FIG. 6. Only the differences between the example organic solvent production system 600 of FIG. 6 and the example organic solvent production system 700 of FIG. 7 are described herein. In the example system 700 of FIG. 7, low pressure steam from the steam condensate vessel 136 is provided to a medium pressure steam compressor 120b to generate medium pressure steam that is delivered to one or more of the evaporators 130 of the evaporation section 132. However, the system 700 of FIG. 7 omits the feedlines and high pressure compressor 120c that compresses and directs the medium pressure steam to the stripper column 122 or stripper reboiler 106c.

Figure 8:
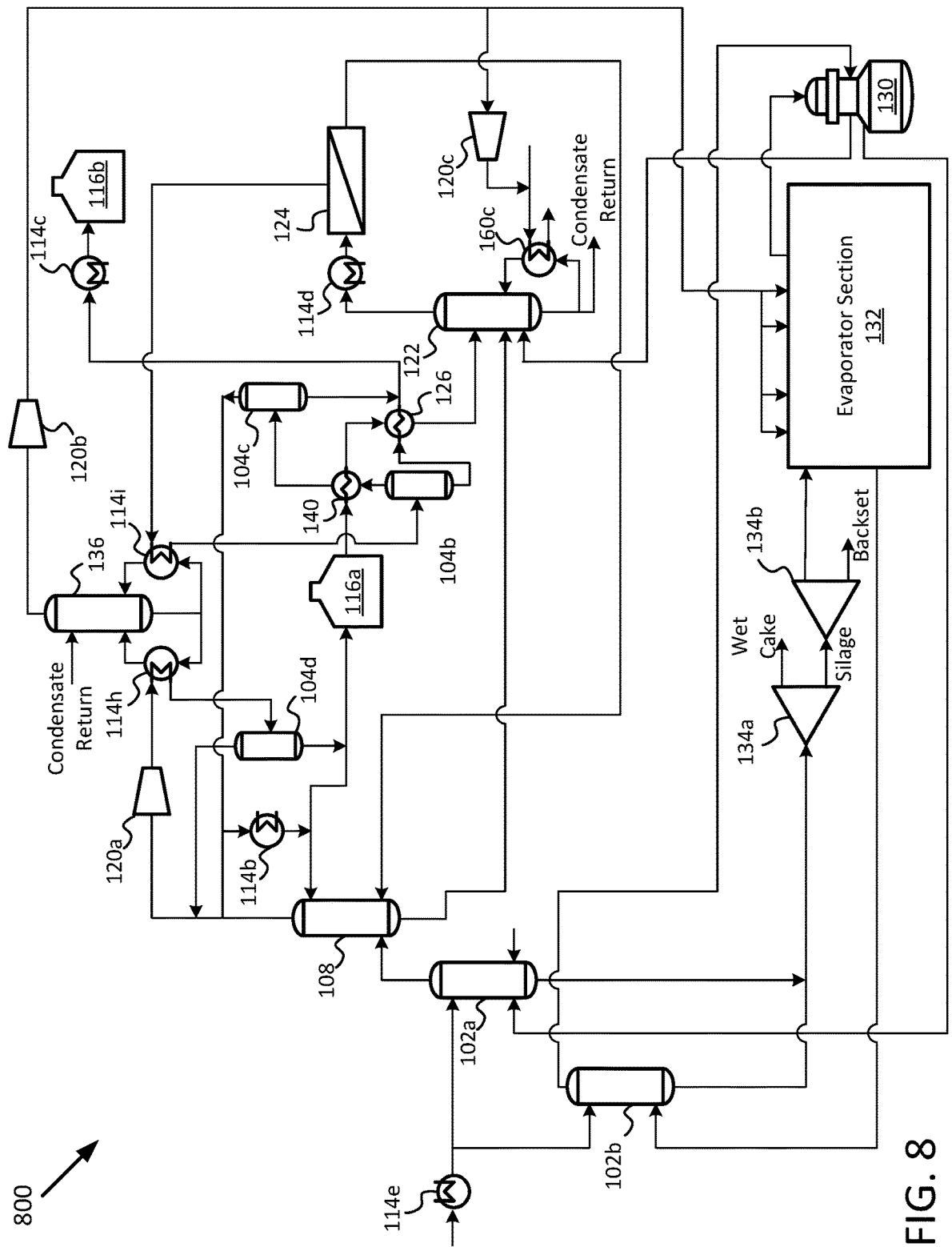
FIG. 8 illustrates an organic solvent production system including a heat recovery system, according to an aspect of the present disclosure.

FIG. 8 illustrates an alternative embodiment of the example system 600 of FIG. 6. Only the differences between the example organic solvent production system 600 of FIG. 6 and the example organic solvent production system 800 of FIG. 8 are described herein. In the example system 800 of FIG. 8, medium pressure steam is directed from the medium pressure compressor 120b to four of the evaporators 130, whereas in the example system of FIG. 6, the medium pressure steam is directed from the medium pressure compressor 120b to two of the evaporators 130, which can be configured add one or more effects or evaporators 130. Accordingly, the first distillation column 102a is driven by fourth effect vapor and the second distillation column 102b is driven by third effect vapor, both through direct vapor injection. Additionally or alternatively, the distillation columns 102 in this configuration could also be driven by respective reboiler 106, where the heating medium is evaporator vapors, cook flash, process flash vapors, or another suitable hot source. Additionally, the permeate is described in FIG. 6 as being condensed and directed to the stripper column 122, while in FIG. 8, the permeate is directed to the rectifier column 108 (or the distillation columns 102) as a vapor without the need to prior condensation. In some aspects, additionally or alternatively, the permeate can also be condensed in a heat exchanger 114 against a cold stream and be sent either to rectifier column 108, side stripper column 110, or stripper column 122. In addition to change in routing of the permeate, the example system 800 of FIG. 8 does not include a side stripper column 110, the second distillation column 102b does not include a reboiler 106 (instead using direct vapor injection), although second distillation column 102b in this configuration can also be driven by a reboiler 106 where the heating medium can be one or more of vapor from the evaporators 130, cook flash vapor, process flash vapor, or another hot source. In some aspects, the operator can turn off a hydroheater in the system 800, and thereby not generate cook flash vapor for use when other hot sources are available.

Figure 9:
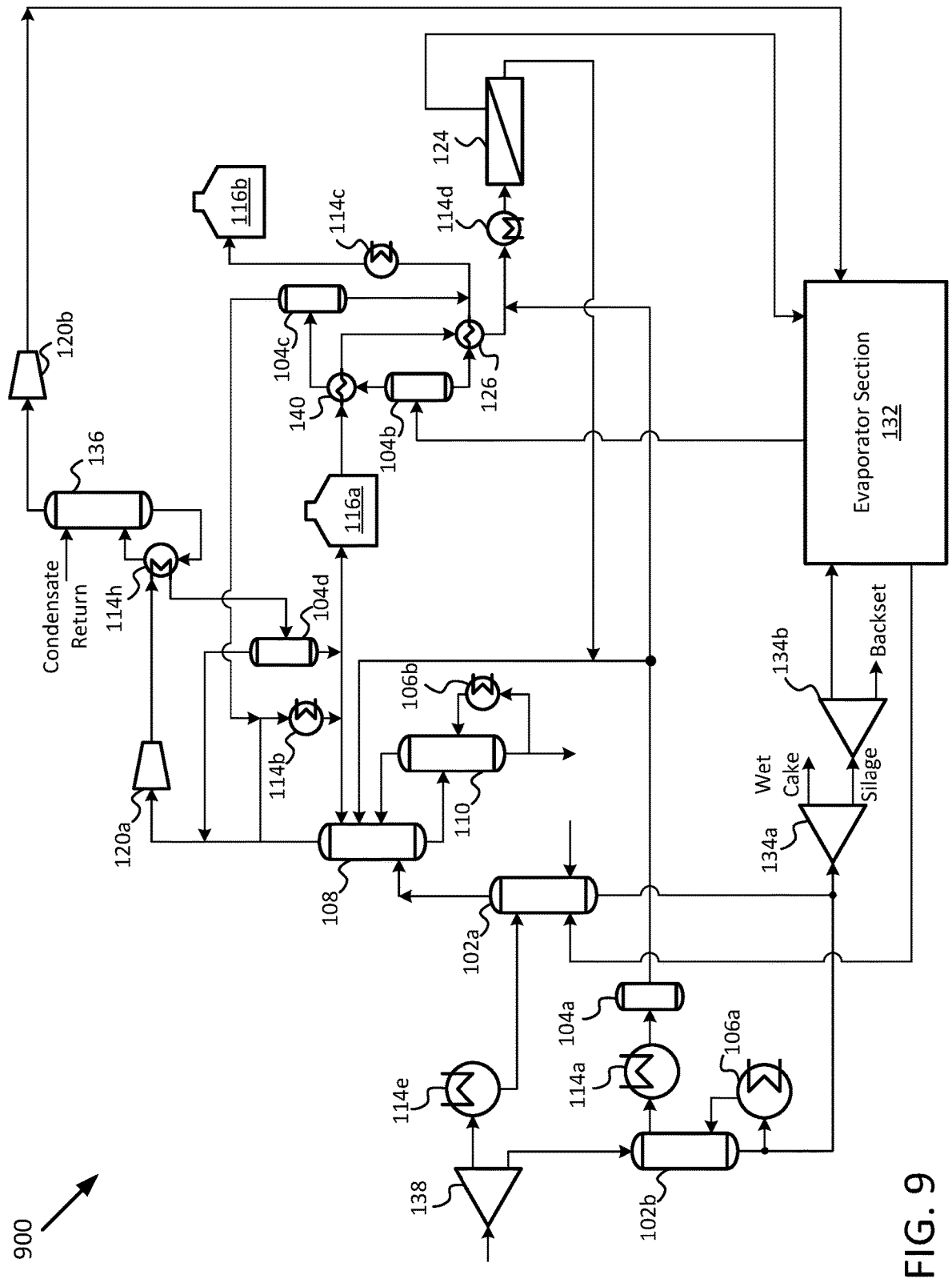
FIG. 9 illustrates an organic solvent production system including a heat recovery system, according to an aspect of the present disclosure.

FIG. 9 illustrates an alternative embodiment of the example system 600 of FIG. 6. Only the differences between the example organic solvent production system 600 of FIG. 6 and the example organic solvent production system 900 of FIG. 9 are described herein. In the example system 900 of FIG. 9, medium pressure steam is directed from the medium pressure compressor 120b to one of the evaporators 130, whereas in the example system of FIG. 6, the medium pressure steam is directed from the medium pressure compressor 120b to the two of the evaporators 130. Additionally, the permeate is described in FIG. 6 as being condensed and directed to the stripper column 122, while in FIG. 8, the permeate is directed to the rectifier column 108 as a vapor (or the distillation columns 102). In some aspects, additionally or alternatively, the permeate can also be condensed in a heat exchanger 114 against a cold stream and be sent to a rectifier column 108, side stripper column 110, or stripper column 122.

An operator may direct or redirect steam from the steam condensate vessel 136 to various numbers of downstream systems by opening or closing various ducts or pipes via valves or installing/uninstalling different pipes and ducts.

Figure 10:
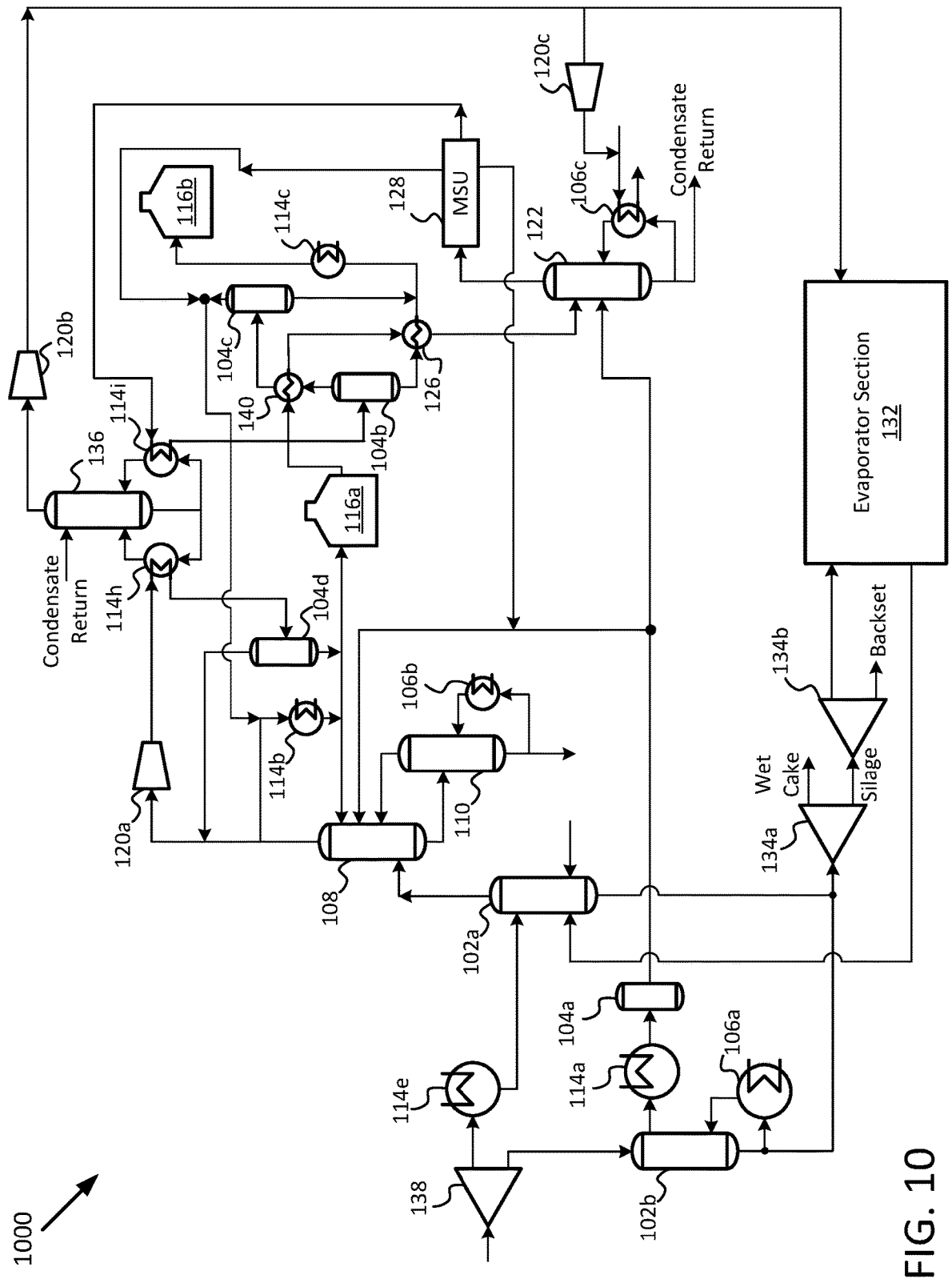
FIG. 10 illustrates an organic solvent production system including a heat recovery system, according to an aspect of the present disclosure.

FIG. 10 illustrates an alternative embodiment of the example system 600 of FIG. 6. Only the differences between the example organic solvent production system 600 of FIG. 6 and the example organic solvent production system 1000 of FIG. 10 are described herein. FIG. 10 illustrates that the steam condensate vessel 136 may receive 200 P vapor from the stripper column 122 and an MSU 128 that receives its feed from a stripper column 122 or rectifier column 108 as a potential source of thermal energy in addition to or instead of the retentate vapor from the membranes 124 in the example system 600 of FIG. 6.

Figure 11:
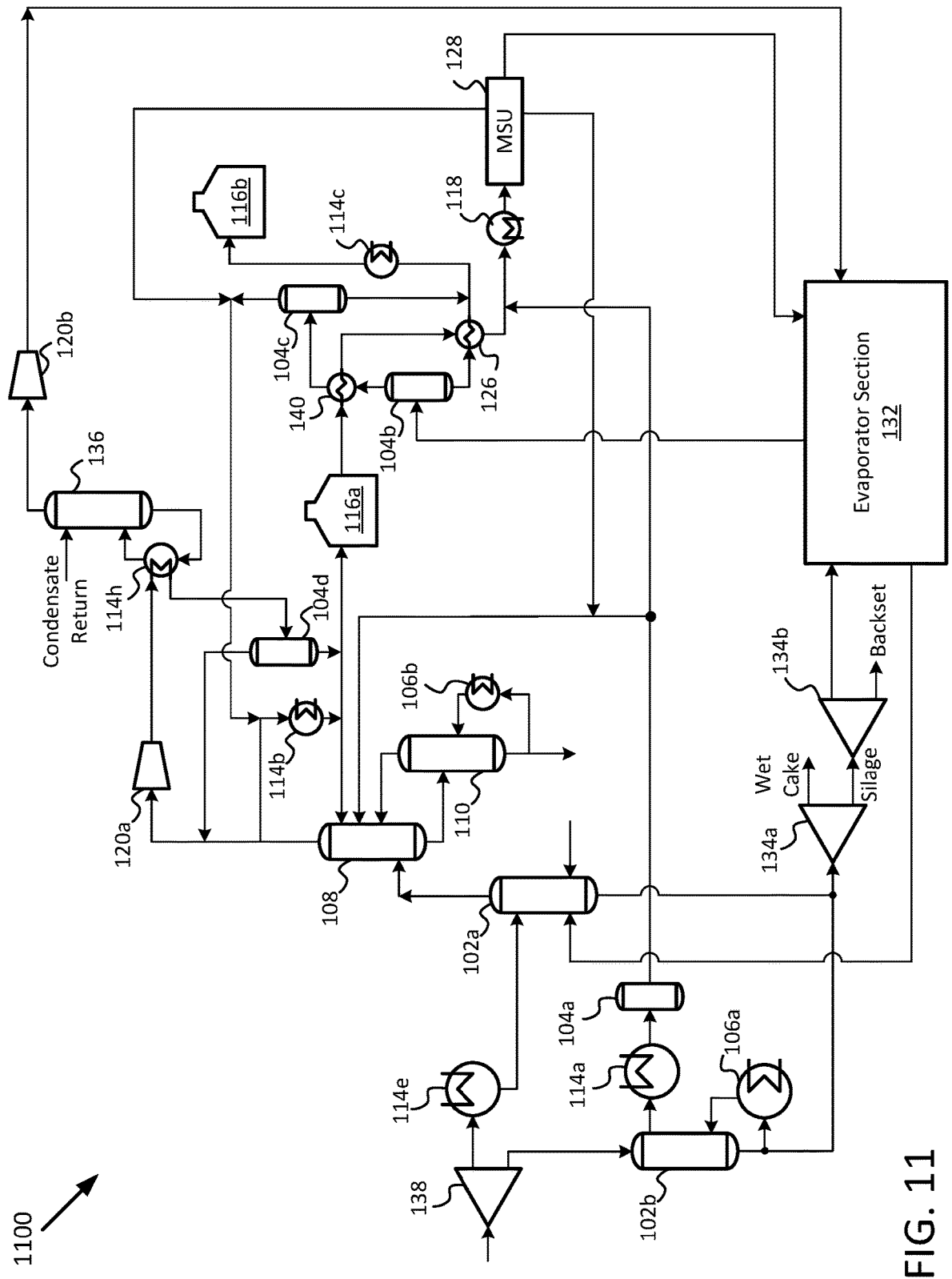
FIG. 11 illustrates an organic solvent production system including a heat recovery system, according to an aspect of the present disclosure.

FIG. 11 illustrates an alternative embodiment of the example system 600 of FIG. 6. Only the differences between the example organic solvent production system 600 of FIG. 6 and the example organic solvent production system 1100 of FIG. 11 are described herein. FIG. 11. illustrates a portion of the compression vapor (e.g., 190 P ethanol in an ethanol production plant) is directed to the steam condensate vessel 136 for heat recovery. Additionally, the 200 P vapor may be routed directly from the MSU 128 to one or more of the evaporators 130 as a heat source therefor, rather than to supplement the thermal energy supplied by the compressed 190 P vapor to the steam condensate vessel 136.

Figure 12:
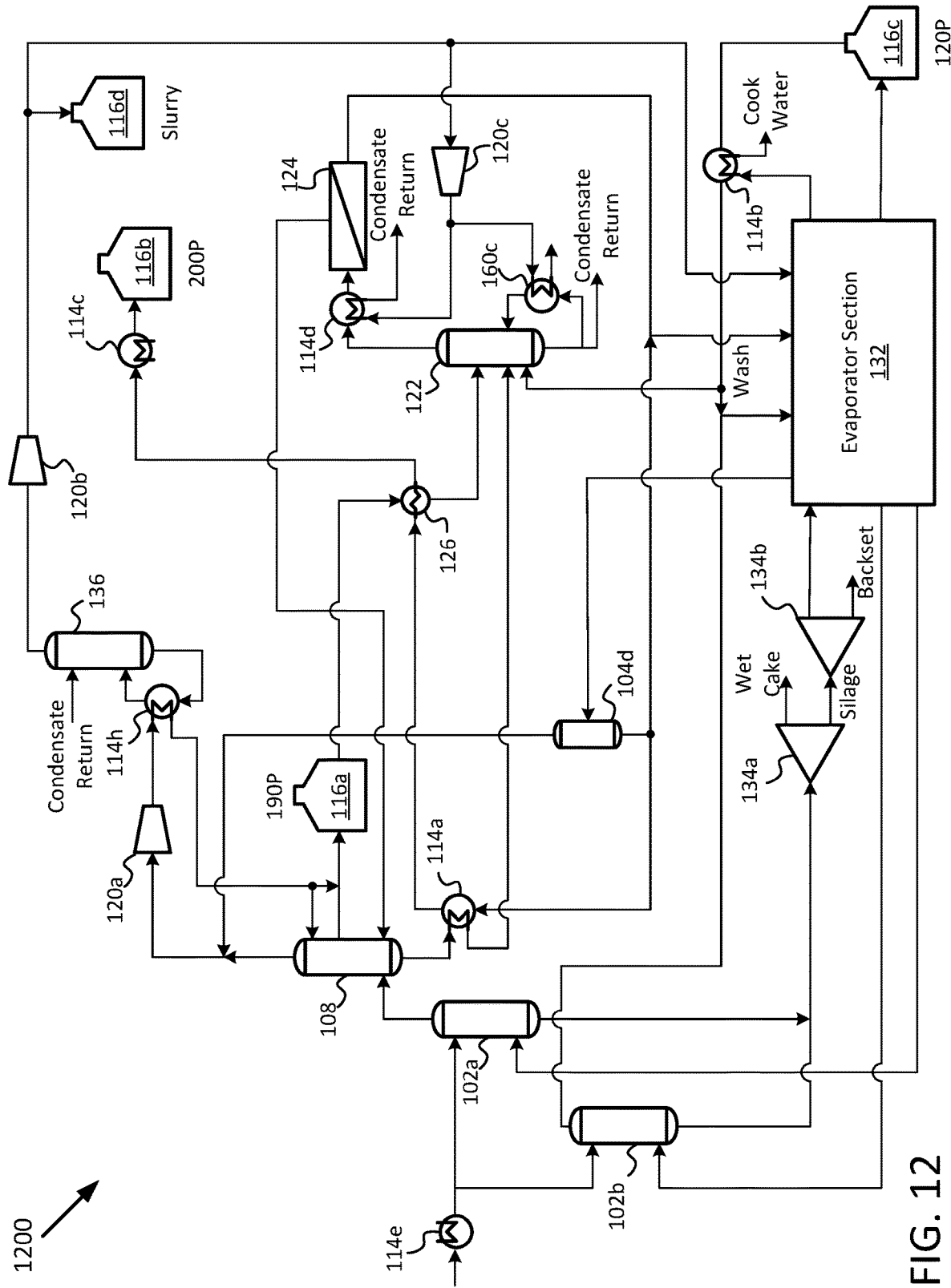
FIG. 12 illustrates an organic solvent production system including a heat recovery system, according to an aspect of the present disclosure.

FIG. 12 illustrates an organic solvent production system 1200 including a heat recovery system, according to an aspect of the present disclosure. The organic solvent production system 1200 includes a first distillation column 102a and a second distillation column 102b that receive a shared feed, which may be preheated by a heater 114e. The evaporator section 132 also provides inputs to the first distillation column 102a (e.g., fourth effect vapors) and second distillation column 102b (e.g., third effect vapors), and the distillation columns 102, in turn supply bottom streams to a centrifuge 134a and splitter 134 that feed back into the evaporator section 132.

The second distillation column 102b provides an overhead stream that is also directed to the evaporator section 132, which in an ethanol production plant may be a 120 P ethanol mixture, that can be stored in a third storage tank 116c before being heated (e.g., via first effect vapors from the evaporator section 132 in a second heat exchanger 114b) as used as a wash or supplemental input to the second distillation column 102b or stripper column 122.

The first distillation column 102a provides an overhead stream to a rectifier column 108, which further refines the organic solvent in the overhead stream, which yields a rectifier overhead stream that is directed to a vapor recompression unit 120a. The vapor recompression unit compresses the rectifier overhead stream and feeds the compressed vapor stream to an eighth heat exchanger 114h for a steam condensate vessel 136 to heat a working fluid in the steam condensate vessel 136 to produce a low pressure steam. The low pressure steam is directed to a first steam compressor 120b to yield a medium pressure steam that may be directed to one or more of a slurry tank 116d, a second steam compressor 120c, or the evaporator section 132 (e.g., to drive evaporation therein or any other low pressure steam consumer in the plant such as a silt tank, cooking system, etc.). The second steam compressor 120c, in turn produces high pressure steam from the medium pressure steam, which may be used in the fourth heat exchanger 114d to preheat the input to the membrane 124 and the third reboiler 160c to drive the stripper column 122 or any other high pressure steam consumer in the plant (eg., an MSU vaporizer, superheater, etc.).

The compressed vapor, after exchanging heat with the working fluid in the steam condensate vessel 136 may return to the rectifier column 108 via a reflux line or be directed to a first storage tank 116a. The first storage tank 116a may store 190 P ethanol when used in an ethanol production plant, which is provided via an economizer 126 to a separation system. In FIG. 12 the separation system includes a stripper column 122, a heat exchanger 114d, and a membrane 124. The membrane 124 receives the heated overhead stream from the stripper column 122 and produces a permeate stream that is directed back to the rectifier column 108 ((=or the distillation columns 102) for use as supplemental feed, and a retentate vapor stream that is directed to the evaporator section 132 for heat recovery, thus yielding a retentate liquid, which is provided to a flash vessel 104d.

The rectifier column 108 also produces a bottom stream, which is directed to a first heat exchanger 114a that uses heat supplied from refined organic solvent (e.g., 200 P ethanol) from the flash vessel 104d to heat the bottom steam before delivering the bottom steam as an input to the stripper column 122. The refined organic solvent stream, after heat is extracted by the first heat exchanger 114a, is then directed to the economizer 126, before being directed to the third heat exchanger 114c for further cooling before being stored in the second storage tank 116b. Additionally, other outputs from the flash vessel 104d may be provided back to the evaporator section 132 (e.g., e.g., a desuperheated 200 P ethanol along with the retentate vapor stream) or the rectifier overheads stream for acidity control.

Figure 13:
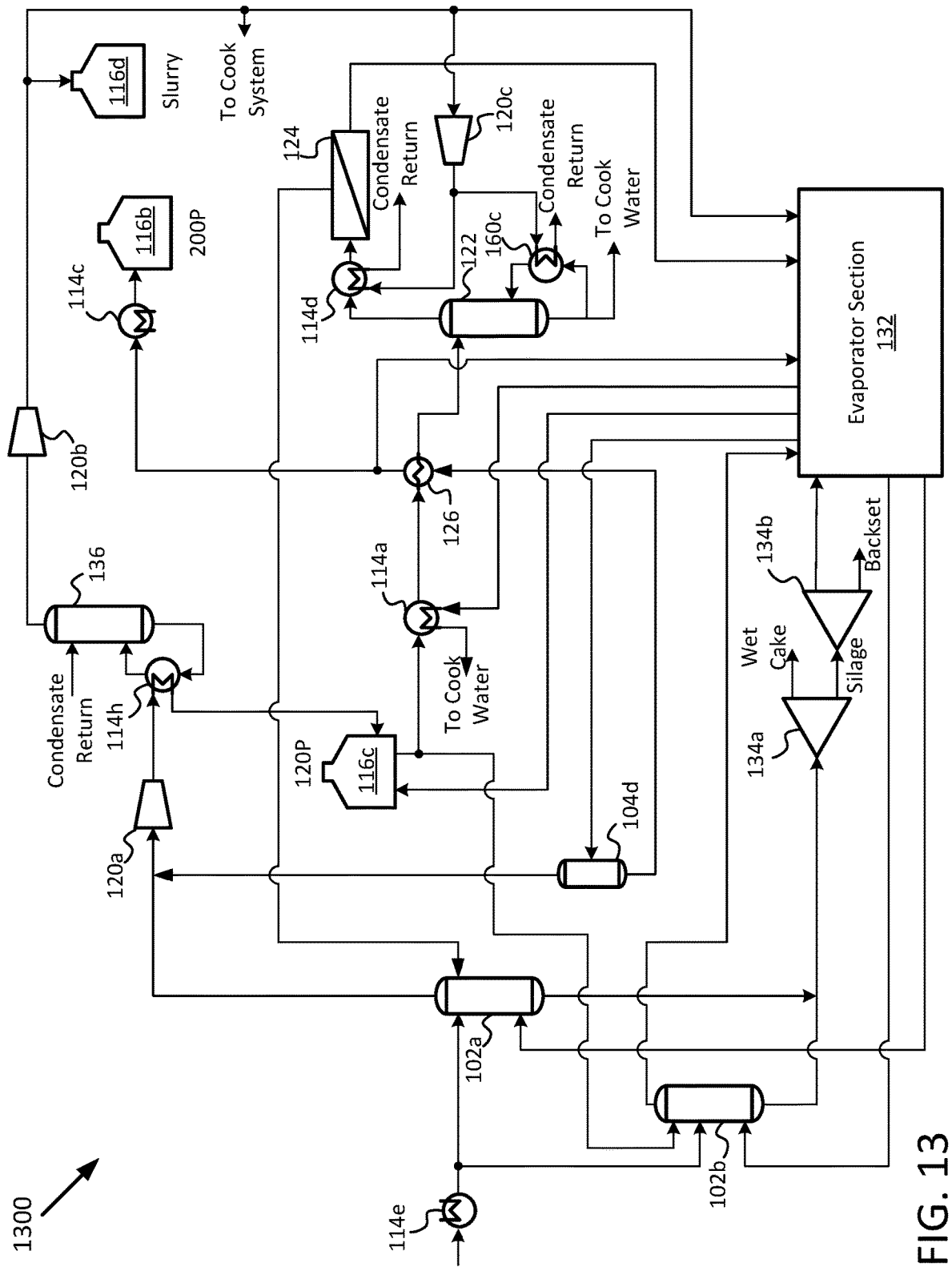
FIG. 13 illustrates an organic solvent production system including a heat recovery system, according to an aspect of the present disclosure.

FIG. 13 illustrates an organic solvent production system including a heat recovery system, according to an aspect of the present disclosure. The organic solvent production system 1300 includes a first distillation column 102a and a second distillation column 102b that receive a shared feed, which may be preheated by a heater 114e. The evaporator section 132 also provides inputs to the first distillation column 102a (e.g., fourth effect vapors) and second distillation column 102b (e.g., third effect vapors), and the distillation columns 102, in turn supply bottom streams to a centrifuge 134a and splitter 134 that feed back into the evaporator section 132.

The second distillation column 102b provides an overhead stream that is also directed to the evaporator section 132.

The first distillation column 102a provides an overhead stream to a vapor recompression unit 120a. The vapor recompression unit 120a compresses the overhead stream and feeds the compressed vapor stream to an eighth heat exchanger for a steam condensate vessel 136 to heat a working fluid in the steam condensate vessel 136 to produce a low pressure steam. The low pressure steam is directed to a first steam compressor 120b to yield a medium pressure steam that may be directed to one or more of a slurry tank 116d, a second steam compressor 120c, a cooking system, or the evaporator section 132 (e.g., to drive evaporation therein). The second steam compressor 120c, in turn produces high pressure steam from the medium pressure steam, which may be used in the fourth heat exchanger 114d to preheat the input to the membrane 124 and the third reboiler 160c to drive the stripper column 122 or any other high pressure steam user in the plant (e.g., MSU vaporizer 118, superheater, etc.).

The compressed vapor, after exchanging heat with the working fluid in the steam condensate vessel 136 via the eighth heat exchanger 114h may be directed to a third storage tank 116c along with at least a portion of the output of the evaporator section 132. The third storage tank 116c may store 120 P ethanol when used in an ethanol production plant, which is provided to the second distillation column 102b for washing (e.g., to ensure ducting/plumbing is free of accumulated solids) or to the separation system for further refinement. In FIG. 13 the separation system includes a stripper column 122, a heat exchanger 114d, and a membrane 124. The membrane 124 receives the heated overhead stream from the stripper column 122 and produces a permeate stream that is directed back to the first distillation column 102a to use to recover heat from, and a retentate vapor stream that is directed to the evaporator section 132 to produce a retentate liquid, which is provided to a flash vessel 104d for acidity control.

The flash vessel 104 yields the refined organic solvent (e.g., 200 P ethanol) from the liquid retentate stream. The refined organic solvent stream is then directed to the economizer 126, before being directed to the third heat exchanger 114c for further cooling before being stored in the second storage tank 116b or being returned to the evaporator section 132 for desuperheating. Additionally, other outputs from the flash vessel 104d may be directed to the vapor recompression unit 120a with the overheads stream from the first distillation column 102a.

Figure 14:
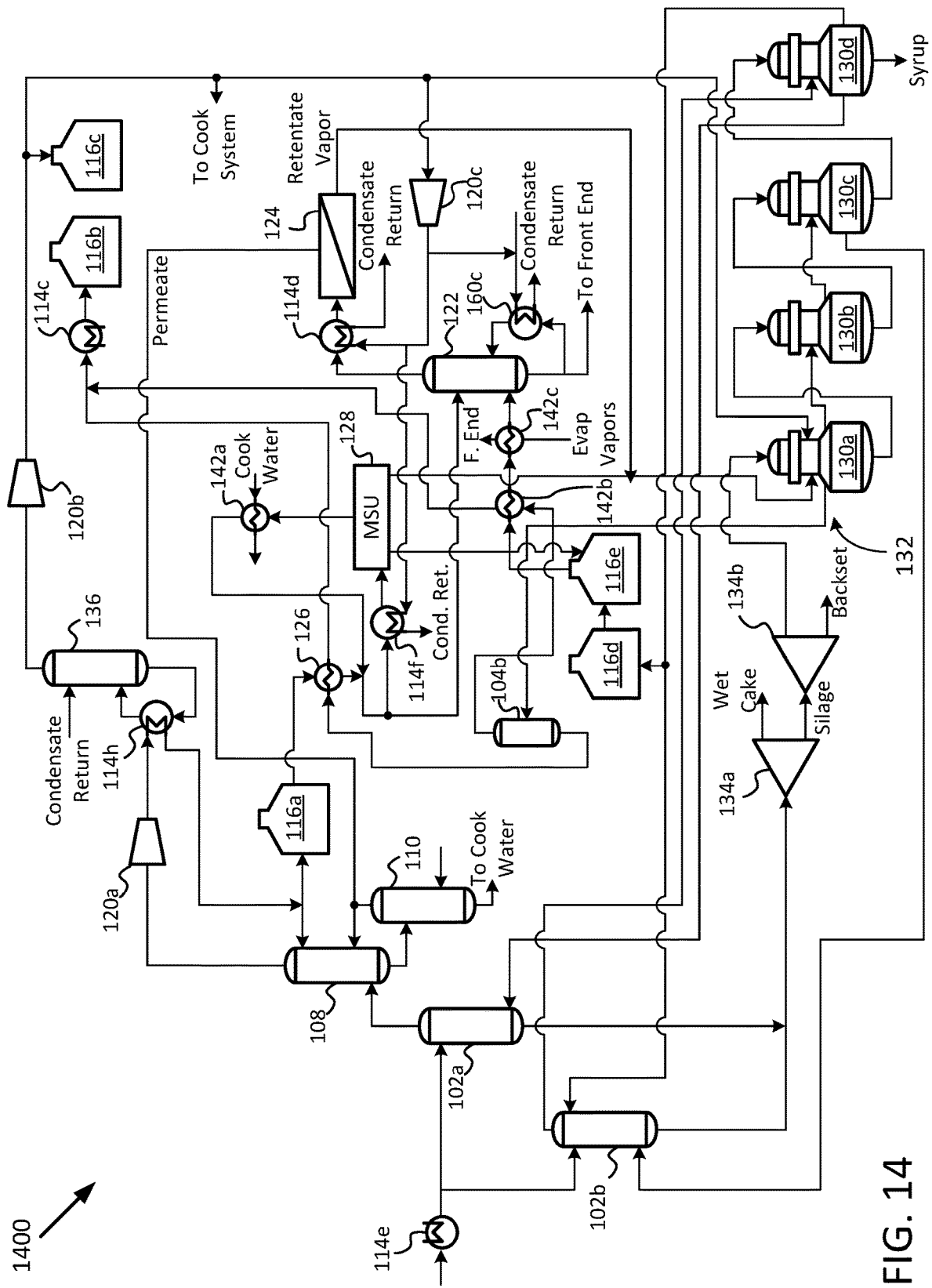

FIG. 14 illustrates an organic solvent production system including a heat recovery system, according to an aspect of the present disclosure. The organic solvent production system 1400 includes a first distillation column 102a and a second distillation column 102b that receive a shared feed, which may be preheated by a heater 114e. The evaporator section 132 also provides inputs to the first distillation column 102a (e.g., fourth effect vapors) and second distillation column 102b (e.g., third effect vapors), and the distillation columns 102, in turn supply bottom streams to a centrifuge 134a and splitter 134 that feed back into the evaporator section 132.

The second distillation column 102b provides an overhead stream that is also directed to the evaporator section 132 (e.g., to a fourth effect evaporator 130d), which in an ethanol production plant may be a 120 P ethanol mixture.

The first distillation column 102a provides an overhead stream to a rectifier column 108, which further refines the organic solvent in the overhead stream, which yields a rectifier overhead stream that is directed to a vapor recompression unit 120a. The vapor recompression unit 120a compresses the rectifier overhead stream and feeds the compressed vapor stream to an eighth heat exchanger for a steam condensate vessel to heat a working fluid in the steam condensate vessel to produce a low pressure steam. The low pressure steam is directed to a first steam compressor 120b to yield a medium pressure steam that may be directed to one or more of a slurry tank 116d, a second steam compressor 120c, a cook section of the organic solvent plant, or the evaporator section 132 (e.g., to a first effect evaporator 130a to drive evaporation therein and any other low pressure steam user in the plant). The second steam compressor 120c, in turn produces high pressure steam from the medium pressure steam, which may be used in the fourth heat exchanger 114d to preheat the input to the membrane 124, the seventh heat exchanger 114f to vaporize the input to the MSU 128, and the third reboiler 160c to drive the stripper column 122 and any other high pressure steam users in the plant.

The compressed vapor, after exchanging heat with the working fluid in the steam condensate vessel 136 via the eighth heat exchanger 114h may return to the rectifier column 108 via a reflux line or be directed to a first storage tank 116a. The first storage tank 116a may store 190 P ethanol when used in an ethanol production plant, which is provided via an economizer 126 to a separation system. In FIG. 14 the separation system includes a stripper column 122, heat exchangers 114d, a vaporizer 114f, a membrane 124, and an MSU 128. The membrane 124 receives the heated overhead stream from the stripper column 122 and produces a permeate stream that is directed back to the rectifier column 108 for use as a heat source, and a retentate vapor stream that is directed to the evaporator section 132 to produce a retentate liquid, which is provided to a flash vessel 104d. Additionally, the MSU 128 vapor feed mixture from vaporizer 114f (which is downstream from the economizer 126) and produces regen stream that is directed to a fifth storage tank 116e, an enriched organic solvent stream (e.g., 200 P ethanol vapor in an ethanol production plant) that is directed to the evaporator section 132, and a depressure stream that is directed through a first preheater 142a (generally or collectively, reheater) that may be charged via cook water from the cook section.

The fifth storage tank 116e may be a feed tank for the separation section, which is fed from the MSU and from a fourth storage tank 116d that is fed from the evaporator section 132 (e.g., from the output of a fourth effect evaporator 130d, which in an ethanol production plant may provide 120 P ethanol). Output from the fifth storage tank 116e is provided to the stripper column 122 as an input after being heated via one of both of a second preheater 142b and a third preheater 142c. The second preheater 142b uses, as a heat source, the enriched organic solvent from the flash vessel 140d (e.g., 200 P ethanol flash vapor in an ethanol production plant) as the enriched organic solvent is directed to the second storage tank 116b. The third preheater 142c uses, as a heat source, the evaporator vapors from the evaporator section, which are then directed to the front end of the organic solvent production plant.

The rectifier column 108 also produces a bottom stream, which is directed to the side stripper column 110 as an input. The side stripper column 110 produces an overhead stream, which is returned to the rectifier column 108 as an input, and produces a bottom stream, which may be directed to the cook water. In various aspects, the side stripper column 110 is also provided with evaporator vapors from the evaporator section 132 or cook flash as inputs.

Figure 15:
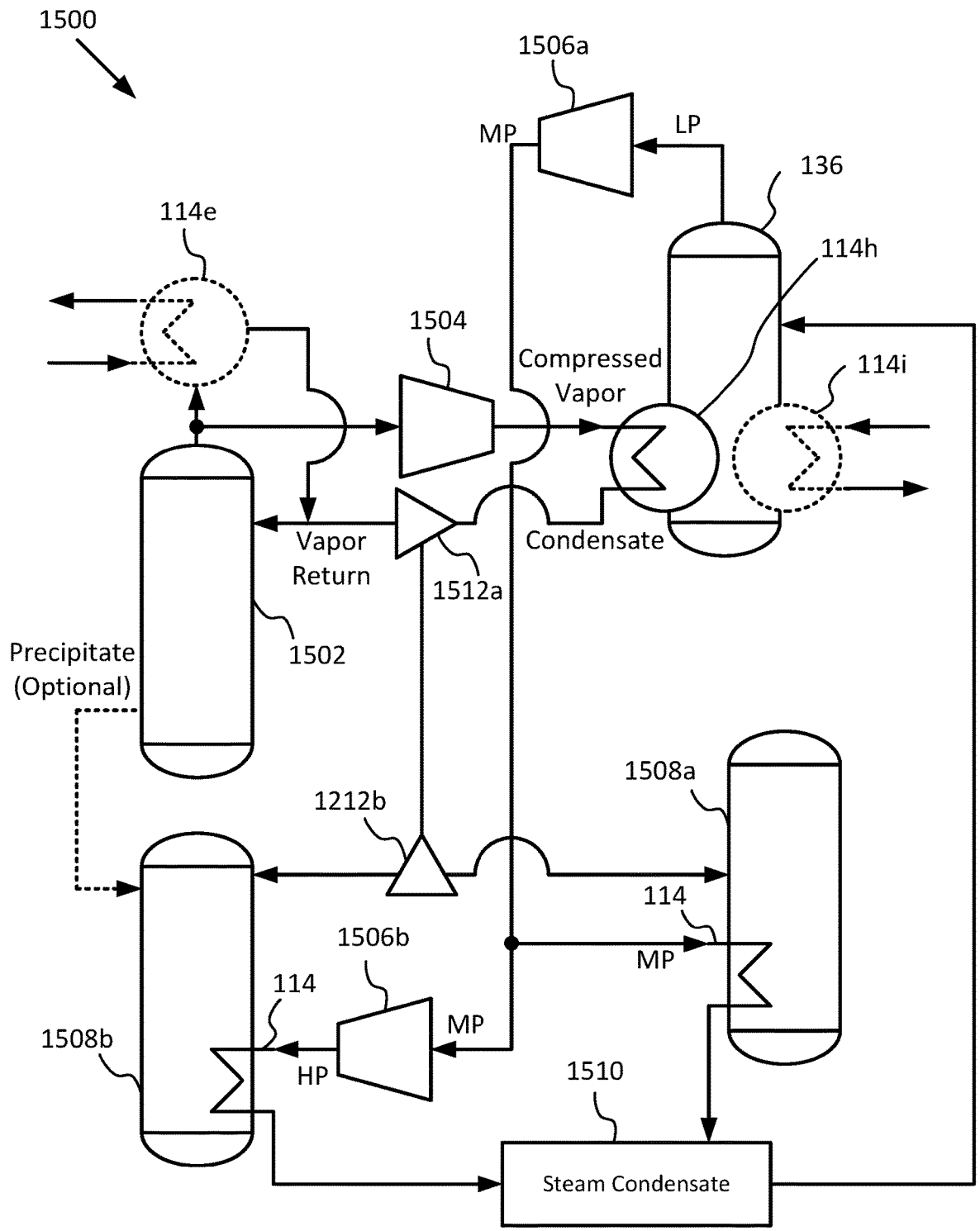
FIG. 15 illustrates a heat recovery system, according to an aspect of the present disclosure.

FIG. 15 illustrates a heat recovery system 1500, according to an aspect of the present disclosure. In various aspects, the heat recovery system discussed in FIG. 15 is part of the vapor recompression unit of the system discussed in relation to FIGS. 6-11. As illustrated in FIG. 15, a reaction vessel 1502 (e.g., a rectifier column 108) is shown, which produces a combustible volatile vapor or concentrates the vapor up to (but not to) the Azeotropic point (e.g., a rectifier/stripper column overhead stream of ethanol, butanol, iso-butanol, methanol, acetone, ammonia, etc. or another organic solvent) that carries thermal energy from the refining process. Although this thermal energy may be sunk to the environment (e.g., via an optional reflux condenser 140 and heat sink) to return the volatile vapor to the rectifier as a liquid or cooler vapor, this thermal energy can additionally or alternatively be extracted for use in other processes in a system or plant that includes the described heat recovery system.

In various aspects, a vapor compressor 1504 receives (on a low pressure side) the heated volatile vapor from the reaction vessel 1502 and outputs a compressed vapor (on a high pressure side) for heat exchange with a working fluid in a steam condensate vessel 136. However, compressing this volatile vapor to improve the extraction of usable thermal energy can pose additional safety considerations, which increase as the volatile vapor is compressed to higher pressures. Accordingly, the compression ratio used by the vapor compressor 1504 may be kept low for safety reasons. For example, when refining ethanol, the vapor compressor 1504 may receive 190 P vapor from a reaction vessel 1502 of a rectifier column 108 in a first range of pressures, and produces a high pressure vapor (at a higher pressure than received from the reaction vessel 1502) that is passed to a heat exchanger 114h in the steam condensate vessel 136. In various aspects, the vapor compressor 1504 is controlled to produce the high pressure compressed volatile vapor at a more consistent pressure than the output vapor from the reaction vessel 1502, but at a lower pressure than is produced by the compressors 1506a-b in fluid communication with the steam condensate vessel 136. In various aspects, one or more additional or other systems may also pass heated (volatile or non-volatile) vapors to other heat exchangers 114i in the steam condensate vessel 136. Once the vapor exchanges thermal energy with the working fluid, the cooled volatile vapor (or liquid) is directed to return to the reaction vessel 1502 (or another system that uses the volatile vapor as an input or output).

Using the heat provided by the supplied volatile vapor (e.g., via the heat exchangers 114h-i), the working fluid in the steam condensate vessel 136 is heated to a steam in a first pressure range. Although the examples given herein generally refer to the working fluid as water and the resulting vapor as steam, the working fluid may include various other fluids that produce non-volatile vapors or vapors that are less volatile than the volatile vapor used to heat the working fluid.

The steam produced at the first pressure by the vapor compressor 1504 may be referred to as a low-pressure (LP) steam, because the heat recovery system 1500 includes additional steam compressors 1506a-b (generally or collectively, steam compressors 1506) that produce various higher pressure steams for use by other systems to receive the thermal energy carried by the steam (e.g., receiving systems 1508*a-b* (generally or collectively, receiving system 1508)). For example, the steam condensate vessel 136 may provide a first steam compressor 1506*a* (on a low pressure side) with the LP steam, and the first steam compressor 1506*a* outputs (on a high pressure side) a medium-pressure (MP) steam. This MP steam may be provided to one or more MP receiving systems 1508*a* (e.g., evaporators 130, slurry tanks, distillation columns 102, side stripper columns 110, stripper columns 122, cook water heaters, superheaters, vaporizers 118, hydroheaters, dryers, etc.) that can use the MP steam as a heat source via corresponding heat exchangers 114. Additionally, the first steam compressor 1506*a* provides a second steam compressor 1506*b* (on a low pressure side) with the MP steam, and the second steam compressor 1506*b* outputs (on a high pressure side) a high-pressure (HP) steam having a higher pressure than the MP steam, which may be provided to one or more HP receiving systems 1508*b* (e.g., stripper columns 122) that can use the HP steam as a heat source via corresponding heat exchangers 114.

Once the higher pressure steams (e.g., the MP and HP steams) transfer the thermal energy to the respective receiving systems 1508, the cooled steam is returned to the steam condensate vessel 136 as a steam condensate 1510 to recirculate and pass additional thermal energy from the circulating vapor output by the reaction vessel 1502. In various aspects, the steam compressors 1506 may be MVR compressors or TVR compressors. For example, HP steam output by the high-pressure steam compressor 1506*b* may be used as a motive steam in the medium-pressure steam compressor 1506*a* to compress the LP steam received from the steam condensate vessel 136 to MP steam to supply to the receiving systems 1508 (and/or the high-pressure steam compressor 1506*b*).

Although illustrated with a two-stage compressor serving two receiving systems 1508, the heat recovery system 1500 of FIG. 15 may be used with more or fewer steam compressors 1506 serving more or fewer receiving systems 1508. Additionally, although illustrates with one reaction vessel 1502, in various aspects, the heat recovery system 1500 of FIG. 15 may receive input volatile vapor from multiple reaction vessels 1502. Although not illustrated in FIG. 12, the receiving systems 1508 may accept additional inputs (e.g., a precipitate from a rectifier, liquid 190 P) that the recovered thermal energy may be used to preheat, and the receiving systems may produce various outputs (e.g., nth effect vapors, syrup) that are not illustrated in FIG. 12.

By passing a volatile output vapor from a rectifier through a vapor compressor linked with a steam condensate vessel, an operator may use a lower compression ratio when converting the volatile vapor to a liquid or cooled vapor to return to the rectifier than using an environmental heat sink and reflux compressor. Accordingly, the operator may use a simpler compressor at a safer operational range (e.g., reducing the risk of fire or explosion) by employing the presently described heat recovery system. The heat transfer medium (e.g., the working fluid) may therefore have a different material composition than the volatile vapor output from the rectifier (e.g., an alcohol mixture versus a water) with different material properties, including a lower volatility, that improve the safety of the heat recovery system, reduce the operating costs, simplify ducting or plumbing between the modules, among other benefits. Additionally, by using a multiphase compression of the steam produced from the working fluid, the operator can transfer heat at different rates to the various receiving systems using a single steam condensate vessel via the at least two different pressures. By using a lower compression ratio (and lower final pressure) to compress the volatile vapor, an operator can improve the overall safety of the system (as well as reducing cost and complexity of the compressors to install, operate, and maintain) compared to using higher compression ratio systems. Additionally, using steam as a hot media source rather than 190 P vapor is practical as steam is already commonly used as a typical utility by plants and equipment are designed to allow for the use of steam without the need of any special material equipment (e.g., corrosion resistant material) needed to handle 190 P vapor. Furthermore, the use of steam allows for the plant to have flexibility to produce different qualities of steam for different applications by only adding or removing stages of compression.

Figure 16:
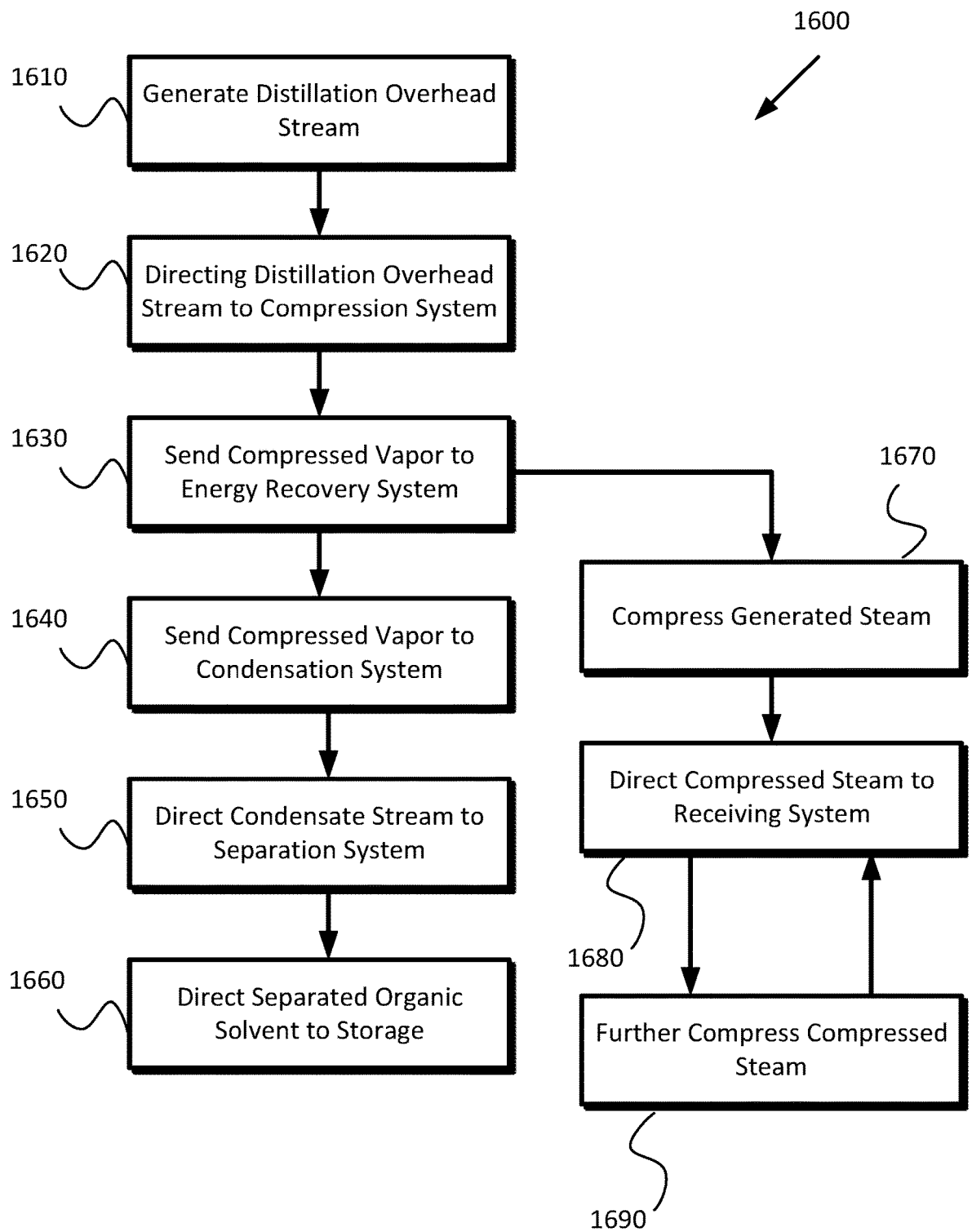
FIG. 16 is a flowchart of an example method for operating an organic solvent production plant via a heat integrated process using vapor recompression, according to an aspect of the present disclosure.

FIG. 16 is a flowchart of an example method 1600 for operating an organic solvent production plant via a heat integrated process using vapor recompression, according to an aspect of the present disclosure. Although various inputs and outputs of the subsystems of the plant are described as being directed, sent, or otherwise acted upon in method 1600, the present disclosure contemplates that some or all of a base component may be split, divided, or redirected into multiple sub-elements. Accordingly, discussion of an element inherently contemplates that all or a sub-portion of the element is acted upon as discussed herein, where a remainder of the element may be acted upon differently by the plant. For example, the plant may direct a feed stock to a distillation column, which describes the scenarios where 100% of the feed stock (in a given time period) is directed to the distillation column and where 100-X % of the feed stock (in a given time period) is directed to the distillation column and X % (e.g., the remainder) is directed to a second distillation column.

Additionally, although presented with various operations in distinct blocks, the present disclosure intends that that method 1600 may be understood as a continuous process that an operator may adjust to meet production demands. Accordingly, it will be understood that blocks 1610-1670 may be performed substantially simultaneously or in different orders than shown in the flowchart of FIG. 16 with some operations being (at least temporarily) omitted or performed at different rates than other operations.

At block 1610, the plant generates a distillation overhead stream of the organic solvent in a distillation system. In various aspects, the plant generates an organic solvent from a feed stock provided to one or more distillation columns. In various aspects, the distillation system includes at least one of a rectifier column, a rectifier column in direct fluid communication with the separation system (via a bottom stream generated by the rectifier column), a rectifier column in direct fluid communication with a side stripper (via the bottom stream from the rectifier column), a rectifier/stripper column, and a beer column. In various aspects, the distillation system comprises a first distillation column operating at a first pressure that receives a first portion of a feed mixture comprising of an organic solvent, water and solids operating in in fluid communication with a second distillation column that receives a second portion of the feed mixture and operates at a second pressure different than the first distillation column. In various aspects, the distillation system is a rectification system that receives a first vaporous overhead stream from a first distillation column as an input, wherein a second distillation column produces a second vaporous overhead stream from a shared feed mixture with the first distillation column that is directed to the separation system without routing through the distillation system. In various aspects, generating the distillation overhead stream includes producing a first and a second vaporous overhead stream at respective first and second distillation columns using a shared feed mixture, where the second vaporous overhead stream is directed to different subsystems for the plant than the first vaporous overhead steam, such as a plurality of multi-effect evaporators that condense the second vaporous overhead stream into a second condensate stream, which may be directed to the separations system.

At block 1620, the plant directs the distillation overhead stream to a compression system to yield a compressed vapor of the distillation overhead stream. In various aspects, the compression system is a vapor recompression unit, comprising one of a mechanical vapor recompression (MVR) compressor or a thermal vapor recompression (TVR) compressor.

At block 1630, the plan sends the compressed vapor to an energy recovery system that generates steam at a first pressure, using heat from the compressed vapor stream to (at least partially) heat a steam condensate into a low pressure steam. In various aspects, hot sources from other subsystems of the plant may also be used to heat the steam condensate, and other heaters may also be used.

Additionally or alternatively to sending the compressed vapor to the energy recovery system, the plant may direct various streams of vapor or liquid against one another via heat exchangers to raise the temperature of a cold stream (e.g., recapturing energy from a hotter stream) or to lower the temperature of a hot stream to adjust the temperature of the various inputs and outputs of the subsystem of the plant using existing temperature differentials in the material handled by the plant.

At block 1640, the plant sends the compressed vapor to a condensation system that yields a condensate stream of the organic solvent. In various aspects, the condensate stream is one of 120 P or 190 P ethanol, which may be used as an input by another system of the plant for further refinement (e.g., into 200 P ethanol), as a refresh stream (e.g., to recharge an MSU), or other purposes in the plant. In various aspects, the condensation system is one of a single evaporator, a plurality of multi-effect evaporators, a heat exchanger, an energy recovery system, or a steam condensate vessel.

At block 1650, the plant directs the condensate stream to a separation system to yield an enriched product stream as a separated organic solvent. In various aspects, the enriched product stream may be 200 P ethanol. The separation system includes at least one of a vaporizer, a stripper column, a membrane, and an MSU, and various combinations thereof as described in relation to FIGS. 1-14. In various aspects, the portion of the condensate stream sent to the separation system is less than all of the condensate stream and a remainder of the condensate stream is sent to the distillation system as at least part of a reflux stream for further processing.

At block 1660, the plant directs the separate organic solvent to storage, such as a storage tank. The portions of the condensate stream separated out from the enriched product stream may be discarded, used for heat exchange, returned to an upstream portion of the plant for reprocessing to extract more of the organic solvent, and combinations thereof.

At block 1670, the plant compresses the generated low-pressure steam from the energy recovery system to a medium pressure steam. In various aspects, the steam in compressed by a vapor recompression unit, comprising one of a mechanical vapor recompression (MVR) compressor or a thermal vapor recompression (TVR) compressor.

At block 1680, the plant directs the compressed vapor to a receiving system that uses the compressed steam at the given pressure as an input. In various embodiments, the receiving system includes one or more of a splitter, an evaporator, a plurality of multi-effect evaporators, a heat exchanger, an energy recovery system, a steam condensate vessel. The steam may be used in a heat exchanger associated with or integrated in various reaction vessels to drive various distillation or separation processes in the plant. In some aspects, the plant sends the compressed vapor to a condensing system, which yields a condensate stream, that is directed to a separation system.

At block 1690, when the receiving system is a supplemental compression unit (e.g., a second vapor recompression unit), the plant further compresses the compressed steam (e.g., from medium pressure to high pressure), and method 1600 returns to block 1680 to allow the plant to direct the higher pressure steam of a receiving system that uses that pressure of steam as an input.

The present disclosure may also be understood with reference to the following numbered clauses:

Clause 1: A distillation and dehydration method comprising: generating a distillation overhead stream in a distillation system; directing the distillation overhead stream to a compression system, yielding a compressed vapor; sending the compressed vapor to a condensation system, yielding a condensate stream; and directing the condensate stream to a separation system.

Clause 2: The method of any of clauses 1 and 3-12, wherein the condensate stream is one of 120 P ethanol or 190 P ethanol.

Clause 3: The method of any of clauses 1-2 and 4-12, wherein the compression system is a vapor recompression unit, comprising one of a mechanical vapor recompression (MVR) compressor or a thermal vapor recompression (TVR) compressor.

Clause 4: The method of any of clauses 1-3 and 5-12, wherein the condensation system includes at least one of: an evaporator; a plurality of multi-effect evaporators; a heat exchanger; an energy recovery system; and a steam condensate vessel.

Clause 5: The method of any of clauses 1-4 and 6-12, wherein the distillation system includes at least one of: a rectifier column; a rectifier column in direct fluid communication with the separation system via a bottom stream generated by the rectifier column; a rectifier column in direct fluid communication with a side stripper via the bottom stream; a rectifier/stripper column; and a beer column.

Clause 6: The method of any of clauses 1-5 and 7-12, wherein the separation system includes at least one of: a vaporizer; a stripper column; a membrane; and a molecular sieve unit (MSU).

Clause 7: The method of any of clauses 1-6 and 8-12, wherein the condensate stream sent to the separation system is less than all of a condensate stream output of the condensation system and a remainder of the condensate stream output is sent to the distillation system as at least part of a reflux stream.

Clause 8: The method of any of clauses 1-7 and 9-12, wherein the distillation system comprises a first distillation column operating at a first pressure that receives a first portion of a feed mixture comprising of an organic solvent, water and solids operating in in fluid communication with a second distillation column that receives a second portion of the feed mixture and operates at a second pressure different than the first distillation column.

Clause 9: The method of any of clauses 1-8 and 10-12, wherein the distillation system is a rectification system that receives a first vaporous overhead stream from a first distillation column as an input, wherein a second distillation column produces a second vaporous overhead stream from a shared feed mixture with the first distillation column that is directed to the separation system without routing through the distillation system.

Clause 10: The method of any of clauses 1-9 and 11-12, further comprising: producing a second vaporous overhead stream at a second distillation column using a shared feed mixture with the distillation column; directing the second vaporous overhead stream to a plurality of multi-effect evaporators; condensing, at the plurality of multi-effect evaporators the second vaporous overhead stream into a second condensate stream; and directing the second condensate stream to the separation system.

Clause 11: The method of any of clauses 1-10 and 12, further comprising: sending the compressed vapor to an energy recovery system that generates steam at a first pressure; compressing the steam from the first pressure to a second pressure, greater than the first pressure; and directing the steam at the second pressure to a receiving system.

Clause 12: The method of any of clauses 1-11, further comprising: recovering heat from a hot stream to heat a cold stream while generating an enriched solvent stream via the separation system.

Clause 13: A distillation and dehydration method, comprising: generating a distillation overhead stream in a distillation system; directing the distillation overhead stream to a compression system, yielding a compressed vapor; sending the compressed vapor to an energy recovery system that generates steam at a first pressure; compressing the steam from the first pressure to a second pressure, greater than the first pressure; and directing the steam at the second pressure to a receiving system.

Clause 14: The method of any of clauses 13 and 15-18, further comprising: sending the compressed vapor to a condensing system, yielding a condensate stream; and directing a portion of the condensate stream to a separation system.

Clause 15: The method of any of clauses 13-14 and 16-18, wherein the receiving system is one of: a splitter; an evaporator; a plurality of multi-effect evaporators; a heat exchanger; an energy recovery system; and a steam condensate vessel.

Clause 16: The method of any of clauses 13-15 and 17-18, wherein the receiving system is a splitter, further comprising: directing a first portion of the steam at the second pressure from the splitter to a second receiving system; compressing a remainder of the steam not directed to the second receiving system from the second pressure to a third pressure, greater than the second pressure; and directing the steam at the third pressure to a third receiving system.

Clause 17: The method of any of clauses 13-16 and 18, wherein the steam is compressed by a vapor recompression unit, comprising one of a mechanical vapor recompression (MVR) compressor or a thermal vapor recompression (TVR) compressor.

Clause 18: The method of any of clauses 13-17, wherein the distillation overhead stream consists of one of 120 P ethanol or 190 P ethanol.

Clause 19: A heat recovery system, comprising: a vapor recompression unit connected on a first low pressure side to an overhead vapor output of a distillation unit and connected on a first high pressure side to a first heat exchanger for a steam condensate vessel; and a first steam compressor connected on a second low pressure side to a steam outlet of the steam condensate vessel and connected on a second high pressure side to a second heat exchanger for a medium pressure receiving system.

Clause 20: The heat recovery system of clauses 19 and 21-26, further comprising: a reflux line connected on a second side of the first heat exchanger from the vapor recompression unit, configured to selectively route portions of a condensate of the overhead vapor output to the distillation unit as part of a reflux stream and to a separation system.

Clause 21: The heat recovery system of clauses 19-20 and 22-26, wherein the medium pressure receiving system is at least one of: an evaporation system including a plurality of evaporators arranged for multi-effect evaporation; a cooking system; a slurry tank; and a turbine.

Clause 22: The heat recovery system of clauses 19-21 and 23-26, further comprising: a plurality of evaporators arranged for multi-effect evaporation and in fluid communication on an input side with a second overhead vapor output of a second distillation unit.

Clause 23: The heat recovery system of clauses 19-22 and 24-26, wherein the vapor recompression unit is configured to compress a vapor received via the first high pressure side via mechanical vapor recompression or thermal vapor recompression.

Clause 24: The heat recovery system of any of clauses 19-23 and 25-26, wherein the steam condensate vessel further includes a third heat exchanger in fluid communication with an external system configured to provide thermal energy to the steam condensate vessel via the third heat exchanger.

Clause 25: The heat recovery system of any of clauses 19-24 and 26, further comprising: a second steam compressor connected on a third low pressure side to the second high pressure side of the first steam compressor and connected on a third high pressure side to a third heat exchanger included in a high pressure receiving system.

Clause 26: The heat recovery system of any of clauses 19-25, wherein the high pressure receiving system is at least one of: a stripper column; a vaporizer; a superheater; and a turbine.

Clause 27: A heat recovery system, comprising: a steam condensate flash vessel including a first heat exchanger and configured to store a steam condensate, wherein the first heat exchanger is configured to exchange heat from a hot source to the steam condensate to generate a low pressure steam; a receiving system including a second heat exchanger configured to receive a medium pressure steam and to exchange heat from the medium pressure steam to a fluid held in the receiving system; a vapor recompression unit connected to the first heat exchanger and configured to compress a vapor overhead stream received from a distillation unit into a compressed overhead vapor that is provided as the hot source to the first heat exchanger; and a first steam compressor configured produce the medium pressure steam from the low pressure steam received from the steam condensate flash vessel and direct the medium pressure steam to the second heat exchanger.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the The invention is claimed as follows:

1. A heat recovery system, comprising:
   a vapor recompression unit connected on a first low pressure side to an overhead vapor output of a distillation unit and connected on a first high pressure side to a first heat exchanger for a condensate vessel;
   a first compressor connected on a second low pressure side to an outlet of the condensate vessel and connected on a second high pressure side to a second heat exchanger for a medium pressure receiving system, wherein the first heat exchanger transfers heat from a first vapor of an organic fluid received from the distillation unit via the vapor recompression unit to a working fluid of a nonorganic fluid in the condensate vessel to generate a second vapor of the working fluid that is output via the outlet to the first compressor; and
   a second compressor connected on a third low pressure side to the second high pressure side of the first compressor and connected on a third high pressure side to a third heat exchanger included in a high pressure receiving system.

2. The heat recovery system of claim 1, further comprising:
   a reflux line connected on an output side of the first heat exchanger opposite to an input side through which the first heat exchanger receives the overhead vapor output from the vapor recompression unit, configured to selectively route portions of a condensate of the overhead vapor output to the distillation unit as part of a reflux stream and to a separation system.

3. The heat recovery system of claim 2, wherein distillation unit includes at least one of:
   a rectifier column;
   a rectifier column in direct fluid communication with the separation system via a bottom stream generated by the rectifier column;
   a rectifier column in direct fluid communication with a side stripper via the bottom stream;
   a rectifier/stripper column;
   a beer column; and
   a beer column in direct fluid communication with the separation system via the overhead vapor output.

4. The heat recovery system of claim 2, wherein the separation system includes at least one of:
   a vaporizer;
   a stripper column;
   a membrane; and
   a molecular sieve unit (MSU).

5. The heat recovery system of claim 1, wherein the vapor recompression unit comprises a mechanical vapor recompression (MVR) compressor.

6. The heat recovery system of claim 1, wherein the condensate vessel further includes a third heat exchanger in fluid communication with an external system configured to provide thermal energy to the condensate vessel via the third heat exchanger.

7. The heat recovery system of claim 1, wherein the vapor recompression unit, comprises a thermal vapor recompression (TVR) compressor.

8. The heat recovery system of claim 1, wherein the vapor recompression unit compresses the first vapor from a first pressure to a second pressure, greater than the first pressure, and wherein the first compressor compresses the second vapor to a third pressure, greater than the second pressure.

9. The heat recovery system of claim 1, wherein the nonorganic fluid has a different material composition that is less volatile than a material composition of the organic fluid.

10. The heat recovery system of claim 1, wherein the first compressor comprises a thermal vapor recompression (TVR) compressor.

11. The heat recovery system of claim 1, wherein the second compressor comprises a thermal vapor recompression (TVR) compressor.

12. A heat recovery system, comprising:
    a condensate flash vessel including a first heat exchanger configured to receive a vaporous overhead stream of an organic fluid as a hot source from a distillation unit, the condensate flash vessel configured to store a condensate of a non-organic fluid, wherein the first heat exchanger is configured to exchange heat from the hot source to the condensate to generate a low pressure vapor at a first pressure;
    a first receiving system including a second heat exchanger configured to receive a medium pressure vapor and to exchange heat from the medium pressure vapor to a first fluid held in the first receiving system;
    a second receiving system including a third heat exchanger configured to receive a high pressure vapor and to exchange heat from the high pressure vapor to a second fluid held in the second receiving system;
    a first compressor configured to produce the medium pressure vapor from the low pressure vapor, which is received by the first compressor from the condensate flash vessel, and direct the medium pressure vapor to the second heat exchanger; and
    a second compressor configured to produce the high pressure vapor from the medium pressure vapor, which is received by the second compressor from the first compressor, and direct the high pressure vapor to the third heat exchanger.

13. A heat recovery system, comprising:
    a condensate flash vessel including a first heat exchanger and configured to store a condensate of a non-organic fluid, wherein the first heat exchanger is configured to exchange heat from a hot source to the condensate to generate a low pressure vapor at a first pressure;
    a first receiving system including a second heat exchanger configured to receive a medium pressure vapor and to exchange heat from the medium pressure vapor to a first fluid held in the first receiving system;
    a second receiving system including a third heat exchanger configured to receive a high pressure vapor and to exchange heat from the high pressure vapor to a second fluid held in the second receiving system;
    a vapor recompression unit connected to the first heat exchanger and configured to compress a vaporous overhead stream of an organic fluid received from a distillation unit into a compressed overhead vapor that is provided as the hot source to the first heat exchanger;
    a first compressor configured produce the medium pressure vapor from the low pressure vapor, which is received by the first compressor from the condensate flash vessel, and direct the medium pressure vapor to the second heat exchanger; and
    a second compressor configured to produce the high pressure vapor from the medium pressure vapor, which is received by the second compressor from the first compressor, and direct the high pressure vapor to the third heat exchanger.

14. The heat recovery system of claim 13, wherein the non-organic fluid has a different material composition than the organic fluid, wherein the non-organic fluid is less volatile than the organic fluid.

\* \* \* \* \*